US006684126B2

(12) United States Patent
Omura et al.

(10) Patent No.: US 6,684,126 B2
(45) Date of Patent: Jan. 27, 2004

(54) MEDICINE STORAGE APPARATUS

(75) Inventors: Shiro Omura, Tokyo (JP); Hideaki Hirobe, Kanagawa (JP)

(73) Assignee: Tosho, Inc. (JP)

( * ) Notice: Subject to any disclaimer, the term of this patent is extended or adjusted under 35 U.S.C. 154(b) by 60 days.

(21) Appl. No.: 09/758,121

(22) Filed: Jan. 12, 2001

(65) Prior Publication Data

US 2001/0008984 A1 Jul. 19, 2001

(30) Foreign Application Priority Data

Jan. 18, 2000 (JP) ....................................... 2000-008447

(51) Int. Cl.[7] ......................... G06F 17/00; G07F 11/00; B65G 59/00; G65H 1/08

(52) U.S. Cl. ........................... 700/231; 700/236; 221/2; 221/279

(58) Field of Search ................................ 700/231, 232, 700/236; 221/2, 6, 14, 123, 129, 131, 266, 279

(56) References Cited

U.S. PATENT DOCUMENTS

| | | | | | |
|---|---|---|---|---|---|
| 5,207,784 | A | * | 5/1993 | Schwartzendruber | 221/14 |
| 5,263,596 | A | * | 11/1993 | Williams | 221/153 |
| 5,346,297 | A | * | 9/1994 | Colson et al. | 312/215 |
| 5,608,643 | A | * | 3/1997 | Wichter et al. | 221/9 |
| 5,713,485 | A | * | 2/1998 | Liff et al. | 221/129 |
| 5,728,999 | A | * | 3/1998 | Teicher | 235/381 |
| 5,805,456 | A | * | 9/1998 | Higham et al. | 700/236 |
| 5,810,198 | A | * | 9/1998 | Townsend et al. | 221/7 |
| 6,112,940 | A | * | 9/2000 | Canella | 221/279 |
| 6,116,461 | A | * | 9/2000 | Broadfield et al. | 221/7 |
| 6,151,536 | A | * | 11/2000 | Arnold et al. | 700/237 |
| 6,189,727 | B1 | * | 2/2001 | Shoenfeld | 221/2 |
| 6,272,394 | B1 | * | 8/2001 | Lipps | 700/231 |
| 6,349,244 | B1 | * | 2/2002 | Bardin et al. | 700/231 |

* cited by examiner

*Primary Examiner*—Gene O. Crawford
(74) *Attorney, Agent, or Firm*—Lorusso, Loud & Kelly

(57) ABSTRACT

A medicine storage apparatus includes a cassette having an inlet-outlet opening for delivering/receiving items of medicine therethrough and adapted to store items of medicine arranged in array while a force is applied to the items of medicine toward the inlet-outlet opening; a support mechanism for supporting the cassette while the inlet-outlet opening is exposed; and a counting mechanism for counting the number of items of medicine stored in the cassette. A user takes out items of medicine stored in the cassette from the inlet-outlet opening in an arrayed sequence when the medicine is to be used. Among the delivered items of medicine, unused items of medicine are pushed back into the cassette from the inlet-outlet opening.

15 Claims, 26 Drawing Sheets

MEDICINE STORAGE APPARATUS

BACKGROUND OF THE INVENTION

1. Field of the Invention

The present invention relates to a medicine storage apparatus.

2. Description of the Related Art

Conventionally, medicine containers, such as ampoules, vials, boxes, bottles, and bags, have been used at medical sites for the purpose of containing various medicines. For example, ampoules and vials are used to contain injections, such as liquid drugs and contrast media; boxes and bottles are used to contain medicines, such as tablets, powders and auxiliary medicines; and bottles and bags are used to contain transfusions.

For example, before an operation is started in an operating room, the medicine containers are appropriately classified and arranged for preparation. In order to avoid a shortage of medicine during treatment of various kinds, ample medicine containers are prepared. Medicine containers which remain unused after completion of an operation are returned to, for example, a pharmacy.

Meanwhile, the amount of medicine consumed during treatment must be confirmed. This work of confirmation is carried out by direct medical practitioners, such as nurses, or by medical assistants through counting of medicine containers disposed of in a disposal container, such as a buckets The direct medical practitioners or medical assistants must enter the amount of consumed medicine into a medicine management document or into a medicine inventory control computer. Such work is troublesome.

In order to cope with the problem, medical sites have introduced a medicine storage apparatus equipped with an automatic delivery mechanism for delivering medicine containers as needed. Users can confirm the amount of consumed medicine on the basis of the state of delivery of medicine containers. The medicine storage apparatus includes detection means, such as medicine container sensors, measuring means, or counting means, in order to detect the state of delivery of medicine containers. Upon reduction in the number of medicine containers stored in the medicine storage apparatus, a user replenishes the apparatus with medicine containers.

However, the above-mentioned conventional medicine storage apparatus requires a user to press a predetermined switch or to pull out a predetermined drawer when the user is to take out a medicine container from the apparatus. Such work is troublesome.

The medicine storage apparatus equipped with medicine container sensors requires the medicine container sensors to be disposed on a one-to-one basis with respect to medicine containers, increasing a cost of the medicine storage apparatus.

The medicine storage apparatus equipped with measuring means is adapted to measure the total weight of medicine containers to thereby calculate the number of medicine containers stored therein on the basis of a unit weight. Thus, the accuracy of calculating the number of stored medicine containers is low.

The medicine storage apparatus equipped with counting means is adapted to count the number of those medicine containers which have moved when a storage shelf is drawn out. Thus, the number of stored medicine containers cannot be counted unless a shelf is drawn out.

Furthermore, for example, when a plurality of cassettes are used in order to classify medicine containers according to type, the medicine storage apparatus can merely detect whether or not each of the cassettes is empty. In this case, since the medicine storage apparatus is not replenished with medicine containers until one or more of the cassettes become empty, it requires time before replenishment, resulting that medicine in need may not be available when need for the medicine arises.

Thus, the medicine storage apparatus fails to be reliably replenished with medicine containers on the basis of the state of delivery of medicine containers therefrom.

SUMMARY OF THE INVENTION

An object of the present invention is to solve the above-mentioned problems involved in the conventional medicine storage apparatus and to provide a medicine storage apparatus enabling a user to take out a medicine container(s) therefrom in a simple manner and to replenish the same with medicine containers in a reliable, prompt manner on the basis of the state of delivery of medicine containers therefrom.

To achieve the above object, the present invention provides a medicine storage apparatus comprising: a cassette having an inlet-outlet opening for delivering/receiving items of medicine therethrough and adapted to store items of medicine arranged in array while a force is applied to the items of medicine toward the inlet-outlet opening; support means for supporting the cassette while the inlet-outlet opening is exposed; and counting means for counting the number of items of medicine stored in the cassette.

A user takes out items of medicine stored in the cassette from the inlet-outlet opening in an arrayed sequence when the medicine is to be used. Among the delivered items of medicine, unused items of medicine are pushed back into the cassette through the inlet-outlet opening.

Accordingly, the user may array items of medicine in the cassette according to expiration dates, thereby suppressing the frequent occurrence of expiration of medicine, even when the medicine is frequently delivered from and returned back to the cassette.

Since the inlet-outlet opening of the cassette is exposed, when the user is to take out medicine from or place medicine into the cassette, the user can visually confirm the medicine. Thus, the user can take out medicine from or return unused medicine back to the cassette in a simple manner.

Since the counting means calculates the number of items of medicine stored in each cassette, even when the medicine is frequently delivered from and returned back to the cassettes, the user can accurately know the state of storage of medicine in real time. Thus, the user can replenish medicine containers reliably and promptly on the basis of state of delivery of medicine.

BRIEF DESCRIPTION OF THE DRAWINGS

The structure and features of the medicine storage apparatus according to the present invention will be readily appreciated as the same becomes better understood by referring to the drawings, in which.

DESCRIPTION OF THE PREFERRED EMBODIMENTS

Embodiments of the present invention will next be described in detail with reference to the drawings.

Figure 1:
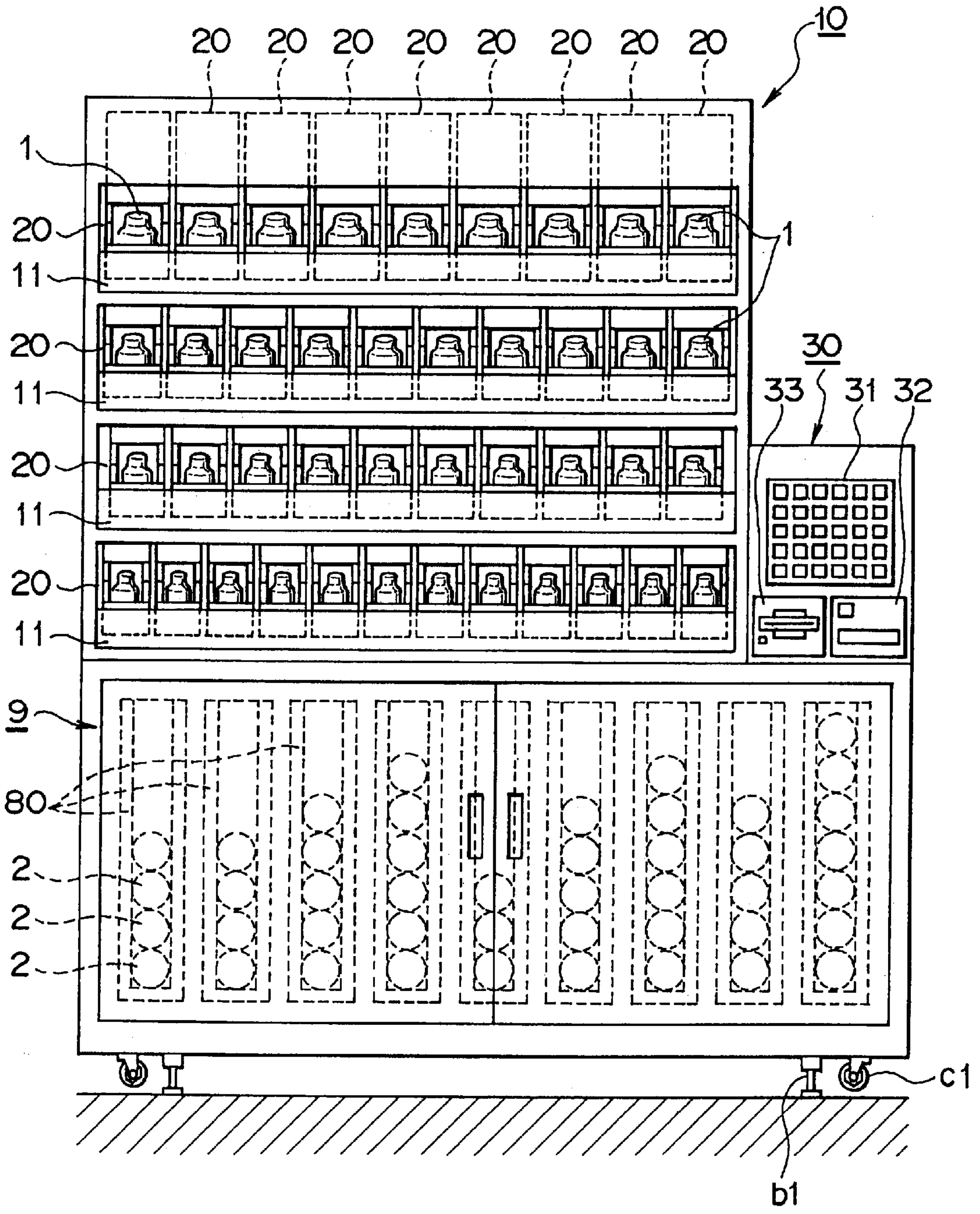
FIG. 1 is a front view of a medicine storage apparatus according to a first embodiment of the present invention.

In FIG. 1, reference numeral 1 denotes a medicine container (in the present embodiment, the container is an ampoule which contains an injection and is sealed and which is sufficiently small to allow a user to hold the same in the fingers), which serves as a small item of medicine; reference numeral 10 denotes a cassette support member, which serves as support means; and reference numeral 30 denotes an operation unit. The cassette support member 10 and the operation unit 30 are disposed adjacent to each other on a base member 9 such that the side of the cassette support member 10 from which a user takes out the medicine container 1 and the side of the operation unit 30 from which the user operates the operation unit 30 face the front side. The base member 9, the cassette support member 10, and the operation unit 30 are electrically connected at the rear side by means of, for example, signal transmission/reception cables (not shown). In the present embodiment, the cassette support member 10 and the operation unit 30 are integrated into a single unit, but may be formed as separate members.

The cassette support member 10 includes an outer frame or housing and cassette shelves 11 disposed in the frame or housing in a plurality of levels (four levels in FIG. 1). A single or a plurality of cassette holders 14 are placed on each of the cassette shelves 11 while being supported by the cassette shelf 11. A plurality of first medicine cassettes; i.e., cassettes 20, are disposed in array on each of the cassette holders 14.

Figure 2:
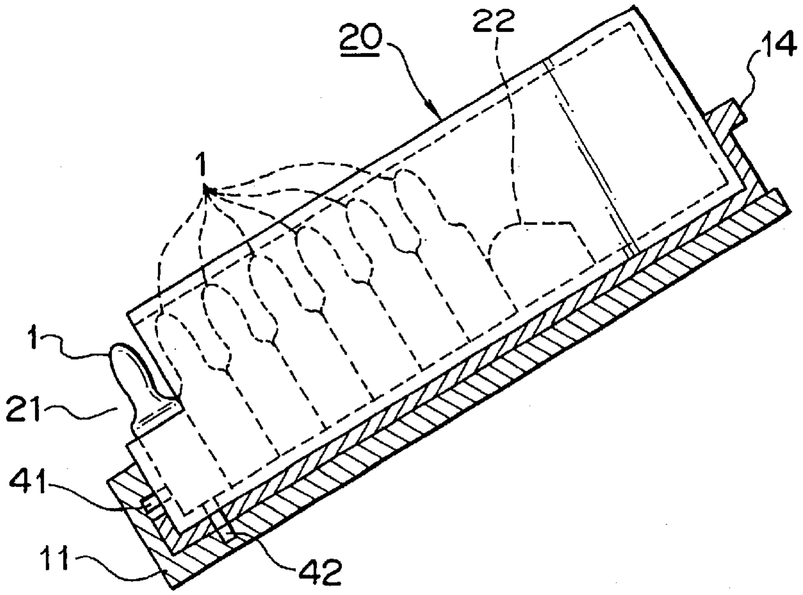
FIG. 2 is a sectional view showing the state of disposition of a first medicine cassette in the first embodiment.

As shown in FIG. 2, the cassette shelf 11 is inclined such that the top face thereof is inclined downward from the rear side (right-hand side in FIG. 2) to the front side (left-hand side in FIG. 2) so as to maintain the cassettes 20 in an inclined state. In order to prevent the cassettes 20 from dropping off, a bend portion (or protrusion portion) is formed at the front end portion of the cassette shelf 11 in an upwardly protruding condition. An open space is formed between the cassette shelves 11 and between the top cassette shelf 11 and the ceiling of the cassette support member 10. When the cassette holders 14 are placed on the cassette shelves 11 such that an inlet-outlet opening 21 of each of the cassettes 20 faces front, all of the inlet-outlet openings 21 and the forwardmost medicine containers 1 are exposed at the front of the cassette support member 10. Sensors 41 and 42, which serve as detection portions, are disposed on the inner surface of each of the cassette shelves 11 at the bend portion and at the front end portion, respectively.

In the present embodiment, part of the medicine container 1 is exposed as illustrated. However, the entire medicine container 1 may be exposed. Also, the medicine container 1 is not necessarily exposed at all times, but may be exposed through opening of opening/closing means, such as a door or a cover, when the same is to be used.

The operation unit 30 assumes the form of a box and includes a keyboard 31 serving as operation means, a printer 32, and a floppy disk drive 33, which are disposed facing forward, as well as a communication unit 34 and a main controller 44, which are disposed internally.

The base member 9 also serves as leg portions for the cassette support member 10 and the operation unit 30 and includes casters c1 and fixing bolts b1 attached to the bottom surface of the same The base member 9 is adapted to store a plurality of second medicine cassettes; i.e., cassettes 80, in array behind an openable front door. Medicine containers 2 (in the present embodiment, transfusion bottles which are too large for a user to handle while holding in the fingers and which contain transfusion solution, such as infusion of nutrient), which serve as large items of medicine and are larger than the medicine containers 1, are stored in array in the cassette 80. In this case, the cassettes 80 are supported directly by the base member 9 without use of a cassette holder.

Figure 3:
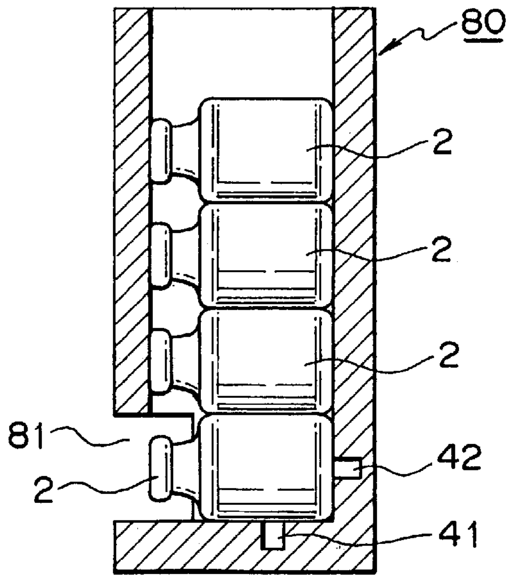
FIG. 3 is a sectional view of a second medicine cassette used in the first embodiment.
Figure 4:
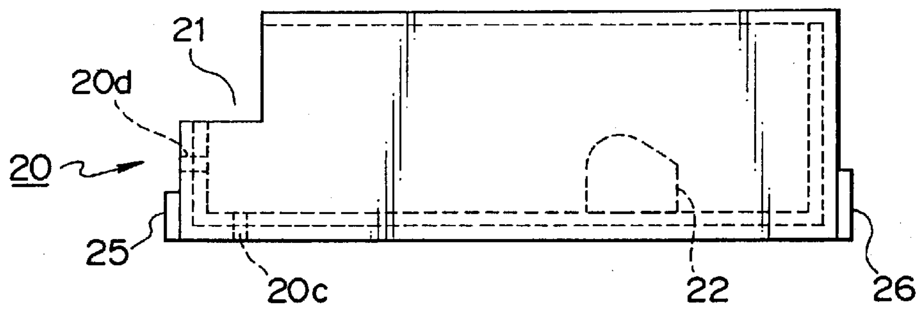
FIG. 4 is a side view of the first medicine cassette used in the first embodiment.
Figure 5:
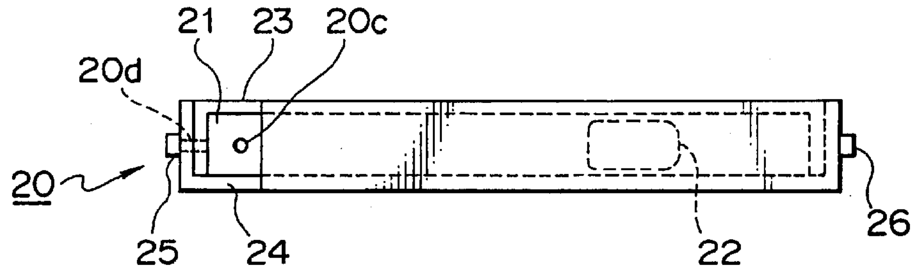
FIG. 5 is a plan view of the first medicine cassette used in the first embodiment.

As shown in FIG. 3, the cassette 80 assumes the form of a box larger than the cassette 20 in order to store the medicine containers 2 in array and is placed vertically in order to enhance storage efficiency. The medicine containers 2 are placed in the cassette 80 from the open top thereof and are stored in a vertical column. A portion; for example, the head portion, of the bottom medicine container 2 is exposed at an outlet 81 such that the bottom medicine container 2 is ready to be drawn out. In this case, the cassettes 80 are fixedly disposed in the base member 9. As shown in FIG. 3, sensors 41 and 42, which serve as detection portions, are embedded in each of the cassettes 80 at a bottom surface portion and at a rear surface portion, respectively. Notably, as in the case of the cassettes 20, a cassette holder (not shown) may be disposed such that the cassettes 80 are removably attached to the cassette holder. In this case, small holes are formed in the cassette 80 in place of the sensors 41 and 42 in such a manner as to extend through the wall of the cassette 80. In either case, the medicine container 2 exposed at the outlet 81 can be detected at a plurality of positions. When the medicine container 2 to be placed for replenishment into the cassette 80 from the top opening is to be detected automatically, detection portions equivalent to the sensors 41 and 42 are disposed in the vicinity of the top end of the cassette 80.

As shown in FIGS. 4 to 7, in order to store the medicine containers 1 in a row extending in the front-rear direction, the cassette 20 assumes the form of a box of a substantial rectangular parallelepiped. The interior space of the cassette 20 has a width and a height slightly greater than those of the medicine container 1 and has a sufficiently long depth. An upper front end portion of the cassette 20 is cut off so as to form the inlet-outlet opening 21. The inlet-outlet opening 21 assumes the form of a step as viewed from the side and is formed such that a head portion (or an upper half) of the medicine container 1 located at the front end of the row of the medicine containers 1; i.e., of the forwardmost medicine container 1, is exposed from the cassette 20. Thus, a user can readily take out the forwardmost medicine container 1 from or can push the same back into the cassette 20 while holding the head portion of the forwardmost medicine container 1 in the fingers. The size of the inlet-outlet opening 21 may be increased such that a user can take out two medicine containers 1 from or can push the same back into the cassette 20 while holding the head portions of the two medicine containers 1 in the fingers.

The inner bottom surface of the cassette 20 is formed from material of low friction coefficient. When the cassette 20 is inclined downward toward the front, the medicine containers 1 stored therein move toward the inlet-outlet opening 21 in a sliding manner by their own weight. A weight 22, which serves as force application means, is disposed in contact with the rearmost medicine container 1 so as to prevent falling of the rearward medicine containers 1 and to apply a force to the rearmost medicine container 1 toward the inlet-outlet opening 21. The weight 22 has a width substantially equal to that of the medicine container 1 so as to freely move in a sliding manner within the cassette 20 in the front-rear direction, as well as a height substantially equal to or less than that of the medicine container 1. In order to reduce friction between the weight 22 and the inner bottom surface of the cassette 20, wheels, sliders, or like members may be attached to the weight 22.

Figure 7:
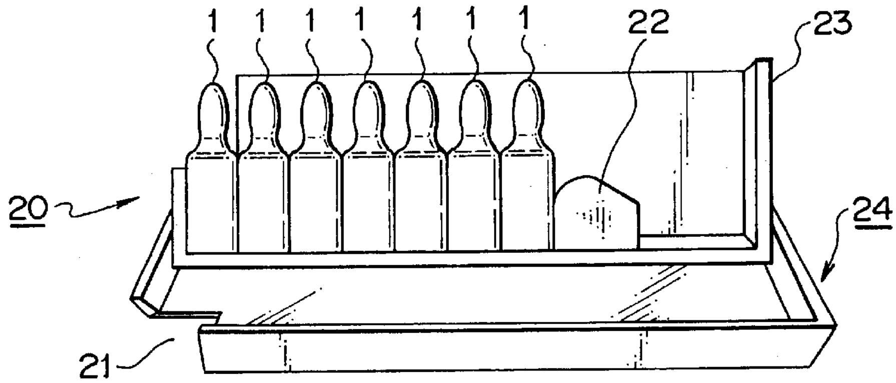
FIG. 7 is a view showing the first medicine cassette used in the first embodiment which is opened for batch replenishment of medicine.

In order to facilitate mass production and replenishment the cassette 20 assumes the form of an assembly of a left-half element 23 and a right-half element 24 of, for example, plastic. The left-half element 23 and the right-half element 24 are engaged in a hinge-like condition at overlapping front-end portions and rear-end portions thereof. The cassette 20 is opened or closed through rotation of the right-half element 24. When the right-half element 24 is closed, the cassette 20 assumes the form of a box. When the right-half element 24 is opened, the interior of the cassette 20 is widely exposed as shown in FIG. 7.

A front-end protrusion 25 is formed on the front-end face of the cassette 20 so as to be fitted into a groove 14*a* formed on the cassette holder 14. A rear-end protrusion 26 is formed on the rear-end face of the cassette 20 so as to be fitted into a groove 14*b* formed on the cassette holder 14. Through-holes 20*d* and 20*c* are formed in the front wall and the bottom of the cassette 20 at positions corresponding the sensors 41 and 42, respectively.

Figure 8:
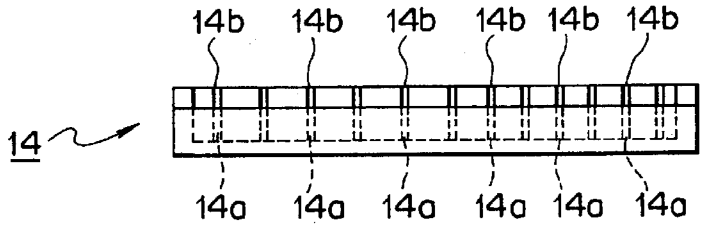
FIG. 8 is a front view of a cassette holder used in the first embodiment.
Figure 9:
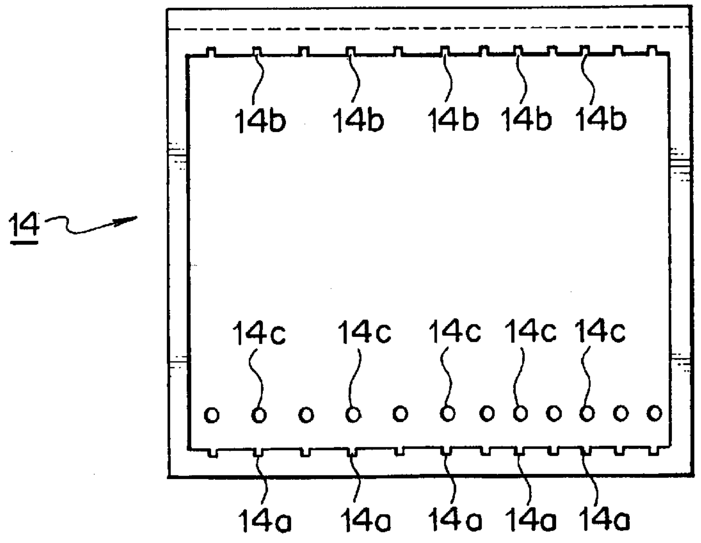
FIG. 9 is a plan view of the cassette holder used in the first embodiment.
Figure 10:
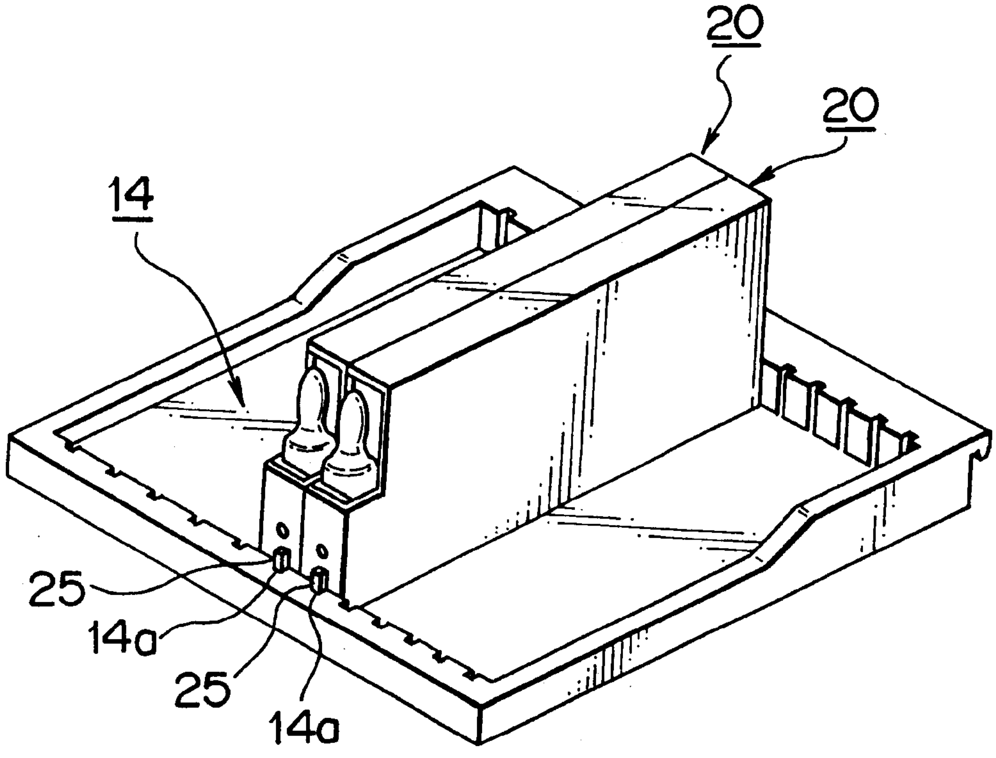
FIG. 10 is a perspective view showing the cassette holder loaded with cassettes used in the first embodiment.

As shown in FIGS. 8 to 10, the cassette holder 14 assumes the form of a shallow rectangular pan and is formed from, for example, light-weight plastic. The length of the cassette holder 14 in the front-rear direction is determined so as to receive the cassette 20. A plurality of grooves 14*a* are formed on the front-side inner wall surface in a vertically extending condition so as to receive the corresponding front-end protrusions 25. A plurality of grooves 14*b* are formed on the rear-side inner wall surface in a vertically extending condition so as to receive the corresponding rear-end protrusions 26. The grooves 14*a* and 14*b* are disposed in one-to-one correspondence. The distance between adjacent grooves 14*a* (14*b*) is equal to or slightly greater than the width of the cassette 20 so as to allow dense arrangement of the cassettes 20. Thus, in the case of a cassette holder 14 for accommodating cassettes 20 of the same width, the grooves 14*a* (14*b*) are formed so as to be arranged at regular pitches. In the case of a cassette holder 14 for accommodating cassettes 20 of different widths. the grooves 14*a* (14*b*) are formed so as to be arranged at irregular pitches. A plurality of through-holes 14*c* are formed in the bottom of the cassette holder 14 at positions corresponding to the sensors 42, at pitches equal to those of the grooves 14*a* (14*b*).

Figure 11:
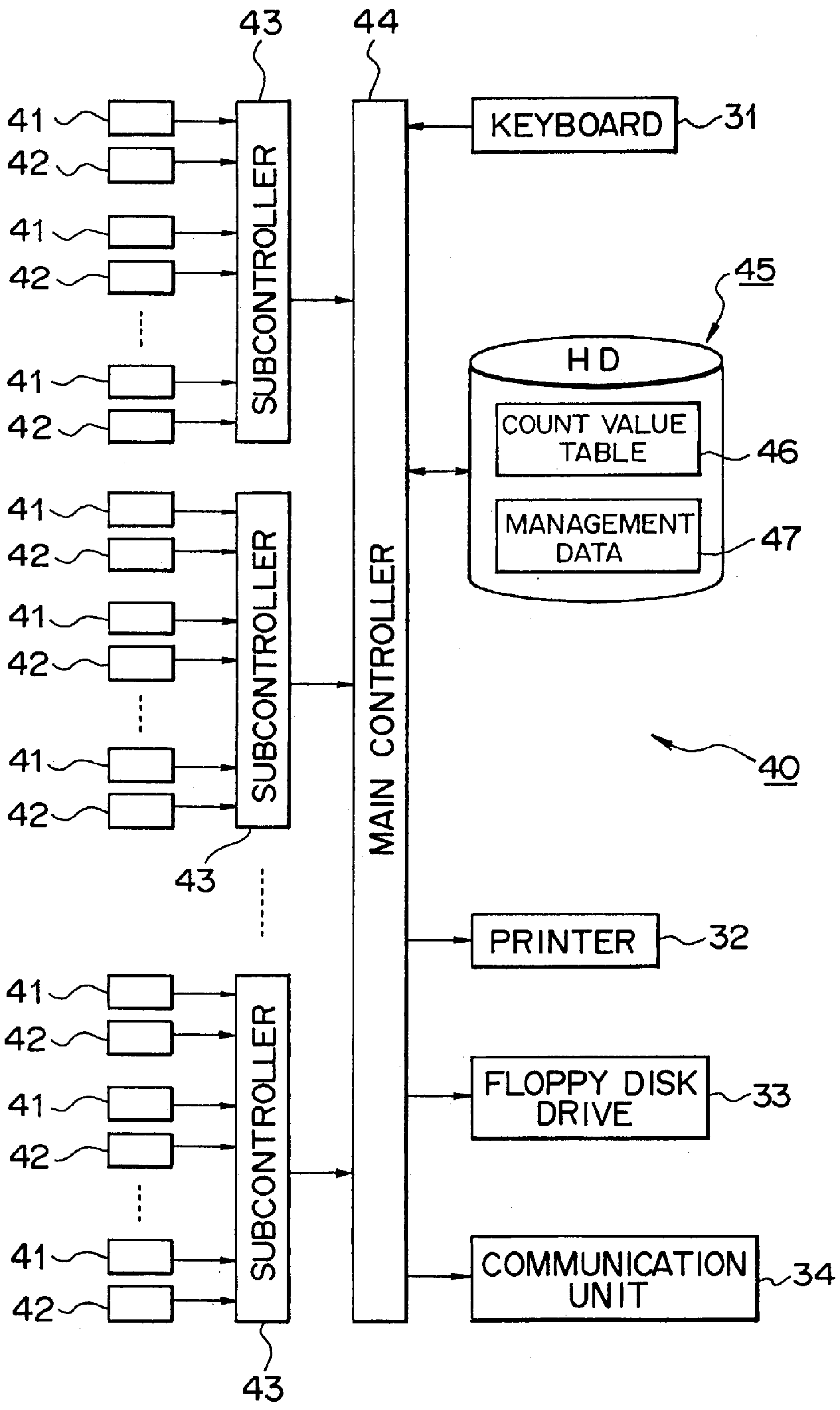
FIG. 11 is a block diagram of a control system for the medicine storage apparatus according to the first embodiment.

As shown in FIG. 11, in order to obtain the number of the medicine containers 1 stored in the respective cassettes 20, a control system 40 includes the sensors 41 and 42 and a main controller 44. Arithmetic processing means (not shown) is disposed in the main controller 44. Specific examples of the sensors 41 and 42 include a reflection-type photosensor for short-distance use. As shown in FIG. 2, pairs each consisting of one sensor 41 and one sensor 42 are embedded in the inner surface of the cassette shelf 11 at predetermined positions. Specifically, the sensors 41 are disposed at the front-end bend portion in such a manner as to face rearward for detection. The sensors 42 are disposed slightly rearward with respect to the front-end bend portion in such a manner as to face upward for detection. As mentioned previously, through-holes 20*d*, 20*c*, and 14*c* are formed in the cassette 20 and the cassette holder 14 at positions corresponding to the sensors 41 and 42 so as to allow light transmitted from the sensors 41 and 42 and reflected light directed to the sensors 41 and 42 to pass therethrough. The forwardmost medicine container 1 stored in each of the cassettes 20 is detected by means of light reflected from a side wall portion and a bottom portion thereof. The present embodiment employs a photo-detection technique using the sensors 41 and 42. Alternatively, a magnetic detection technique, a capacity-change detection technique, a contact detection technique, or like technique may be employed.

The main controller 44 includes a microprocessor system and can collect data regarding the results of detection by all the sensors 41 and 42 via subcontrollers 43 disposed for the corresponding cassette shelves 11. Detection processing means (not shown) of the main controller 44 determines whether or not the medicine container 1 is taken out from or pushed back into the cassette 20 through the inlet-outlet opening 21, on the basis of a transitional pattern of detection by each pair of the sensors 41 and 42. A count value table 46 is stored on an internal or external hard disk (HD) 45. The count value table 46 contains a counted number of the medicine containers 1 stored in each of the cassettes 20. On basis of the results of detection by the sensors 41 and 42, the count values stored in the count value table 46 are incremented or decremented.

Figure 12:
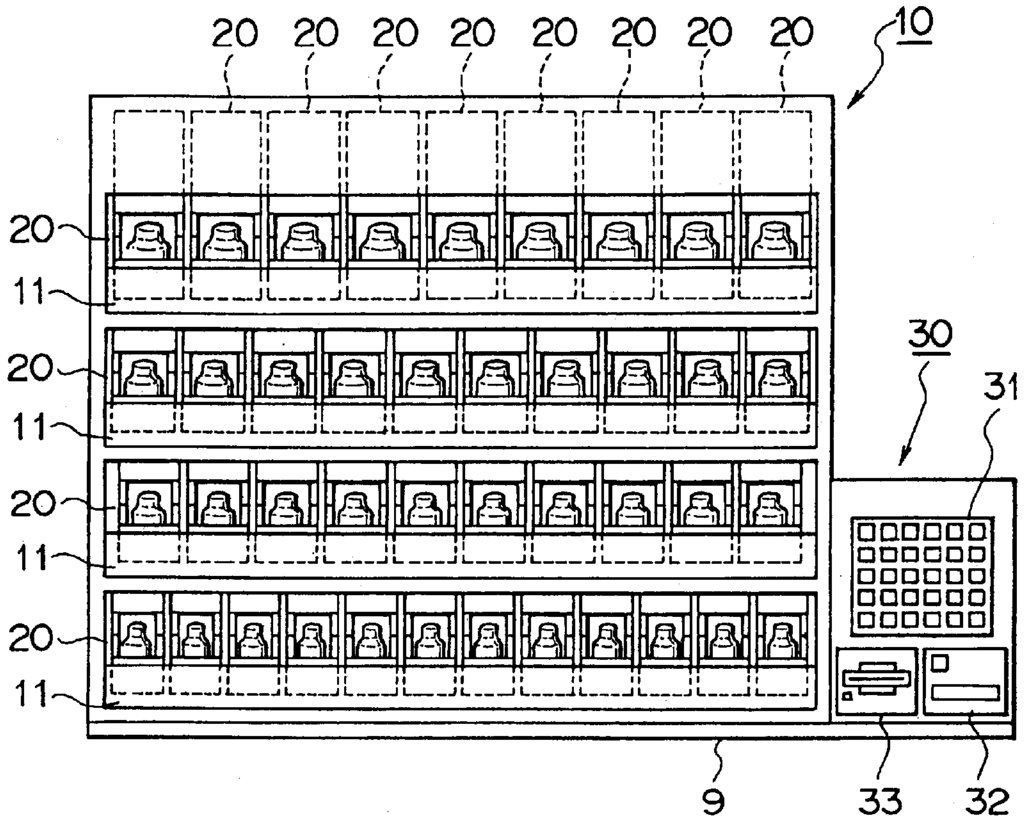
FIG. 12 is a front view showing a modified embodiment of the medicine storage apparatus according to the first embodiment.
Figure 13:
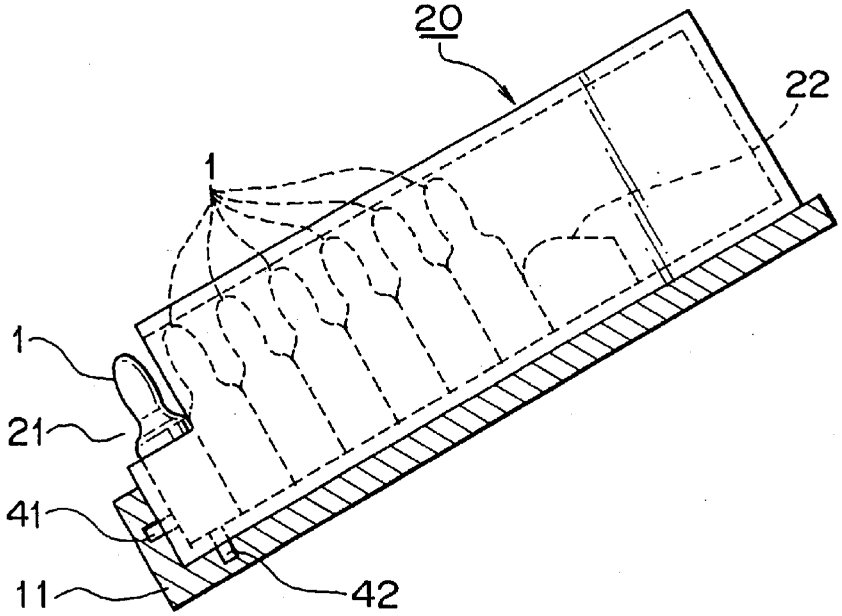
FIG. 13 is a view showing the state of disposition of a modified embodiment of the first medicine cassette used in the first embodiment.

Notably, as shown in FIG. 12, the medicine storage apparatus does not necessarily employ the base member 9 which contains cassettes. In this case, the medicine storage apparatus is place on, for example, a cart or a stand equipped with casters. As shown in FIG. 13, the cassette shelf 11 may directly support the cassette 20 without employment of the cassette holder 14.

Next will be described the operation of the medicine storage apparatus having the above-described configuration.

In advance, the medicine containers 2 of appropriate dimensions are stored in the cassettes 80, and the medicine containers 1 of appropriate dimensions are stored in the cassettes 20. The medicine containers 1 having expiration dates are stored such that a medicine container 1 of an earlier expiration date is positioned closer to the front side. When the medicine containers 1 and/or 2 are stored in the cassette (s) 20 and/or 80 while the power is turned off or when the cassette(s) 20 and/or 80 is removed and batch replenished with the medicine containers 1 and/or 2, a user appropriately initializes the count value table 46 through operation from, for example, the keyboard 31.

When the cassette 20 is to be batch replenished with a required number of medicine containers 1, the cassette 20 is opened as shown in FIG. 7. The required number of medicine containers 1 are placed in the left-hand half element 23 so as to be arranged sequentially from the side of the inlet-outlet opening 21. Subsequently, the weight 22 is placed adjacent to the rearmost (rightmost in FIG. 7) medicine container 1. Then, the cassette 20 is closed.

Figure 6:
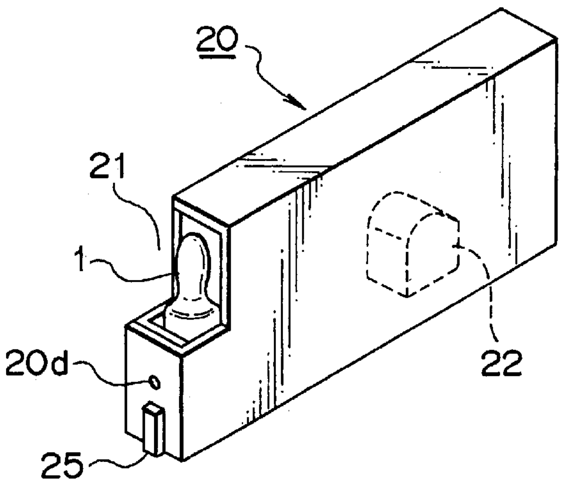
FIG. 6 is a perspective view of the first medicine cassette used in the first embodiment.

Since the cassette 20 loaded with the medicine containers 1 is supported in a condition inclining downward toward the front side, as shown in FIG. 6, the forwardmost medicine container 1 reaches the inlet-outlet opening 21, allowing a user to hold a head portion thereof in the fingers. As shown in FIG. 10, a plurality of cassettes 20 are arranged on each of the cassette holders 14. The thus-loaded cassette holders 14 are placed on the cassette shelves 11, thereby setting up the medicine storage apparatus as shown in FIG. 1, which is ready for use at an operating room.

When the medicine containers 1 are, for example, ampoules which contain an injection for use in an operation, the above-mentioned preparation work is usually performed in a prescription department or an operation anteroom in a hospital. The preparation work may be performed for every operation, but is usually performed in predetermined cycles, such as every half day or every day, so as to ease work load. In this case, the cassettes 20 are loaded with the medicine containers 1 which are sufficient in number for an assumed number of operations. The cassettes 20 loaded with the medicine containers 1 capable of being stored at room temperature are stored in the cassette support member 10. The cassettes 20 loaded with the medicine containers 1 which must be stored in a refrigerated condition are stored in, for example, a refrigerator in the operation anteroom.

When the above-mentioned preparation work is performed in the operation anteroom, the cassettes 20 are stored in the operation anteroom until an operation is started. When the preparation work is performed in the prescription department, the cassette holders 14 loaded with the cassettes 20 are transferred on a medicine transport cart to the operation anteroom and are temporarily stored on medicine shelves and in a refrigerator in the operation anteroom. Subsequently, the cassettes 20 loaded with the medicine containers 1 capable of being stored at room temperature are arranged on the cassette holders 14, which are then loaded into the medicine storage apparatus and allowed to stand until an operation is started. The cassettes 20 which have been stored in the refrigerator are taken out from the refrigerator immediately before an operation is started, and are arranged on the cassette holders 14, which are then loaded into the medicine storage apparatus. Notably, in order to avoid shortage of the medicine containers 2 during treatment, ample medicine containers 2 are loaded into the cassettes 80.

When an operation is about to start, the medicine storage apparatus is transferred into the operating room. In this case, when the medicine storage apparatus is placed on, for example, a cart or a stand equipped with casters, the cart or the stand is transferred into the operating room. When the medicine storage apparatus is not placed on any transportation means, such as the cart or the stand, the same is transferred into the operating room by use of predetermined transportation means and then transferred onto a desk, a stand, or like support. Subsequently, the medicine storage apparatus is powered on so as to be started.

Next will be described the function for detecting a user's operation for drawing out the medicine container 1 from or pushing the same back into the cassette 20.

When the forwardmost medicine container 1 is drawn out from the inlet-outlet opening 21 of the cassette 20 which contains the predetermined medicine containers 1, the state of detection performed by the sensors 41 and 42 changes according to the movement of the forwardmost medicine container 1. The detection processing means interprets the change in the state of detection as occurrence of an action that the medicine container 1 has been drawn out.

Figure 14:
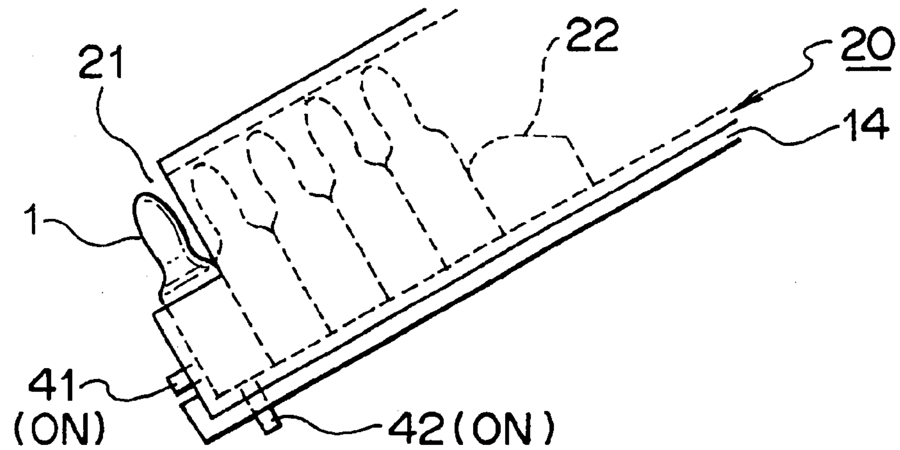
FIG. 14 is a first view showing an action of drawing out a medicine container from the first medicine cassette used in the first embodiment.
Figure 15:
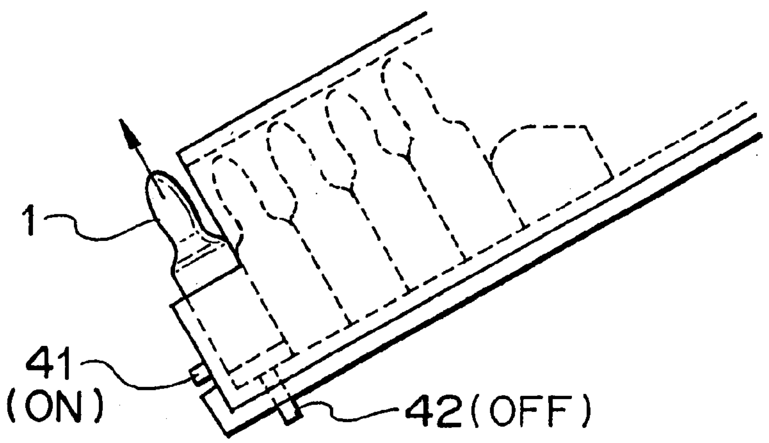
FIG. 15 is a second view showing the action of drawing out the medicine container from the first medicine cassette used in the first embodiment.
Figure 16:
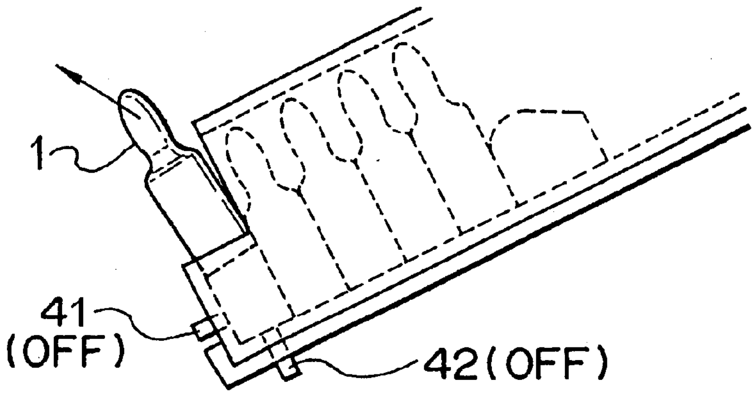
FIG. 16 is a third view showing the action of drawing out the medicine container from the first medicine cassette used in the first embodiment.
Figure 17:
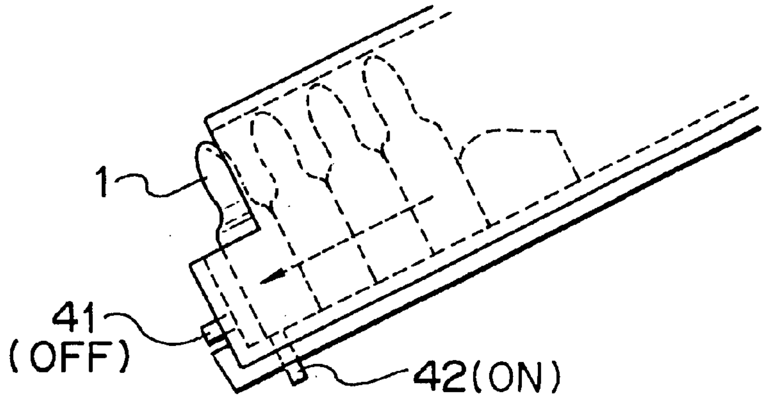
FIG. 17 is a fourth view showing the action of drawing out the medicine container from the first medicine cassette used in the first embodiment.
Figure 18:
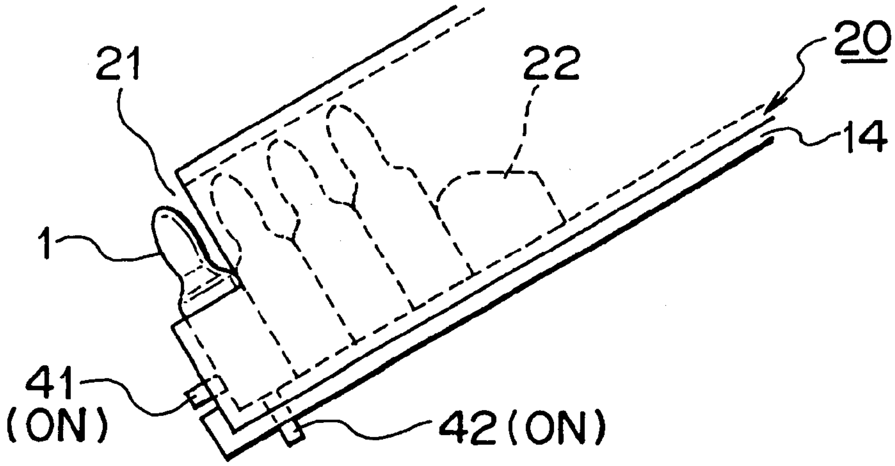
FIG. 18 is a first view showing an action of pushing the medicine container into the first medicine cassette used in the first embodiment.
Figure 19:
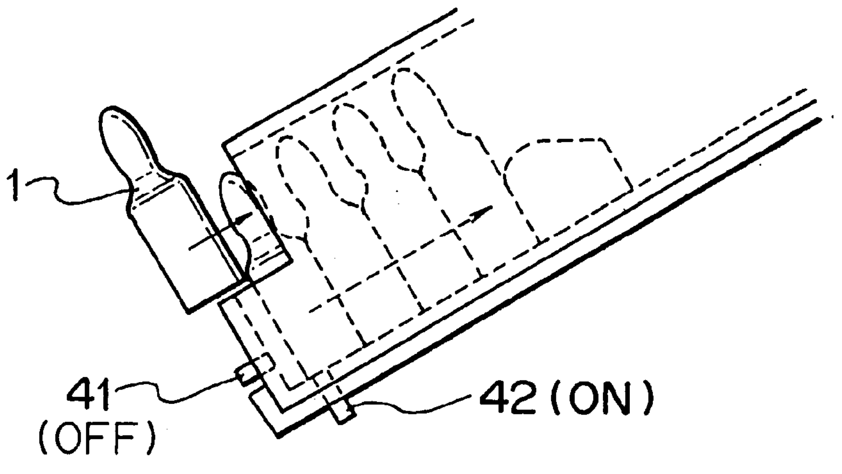
FIG. 19 is a second view showing the action of pushing the medicine container into the first medicine cassette used in the first embodiment.
Figure 20:
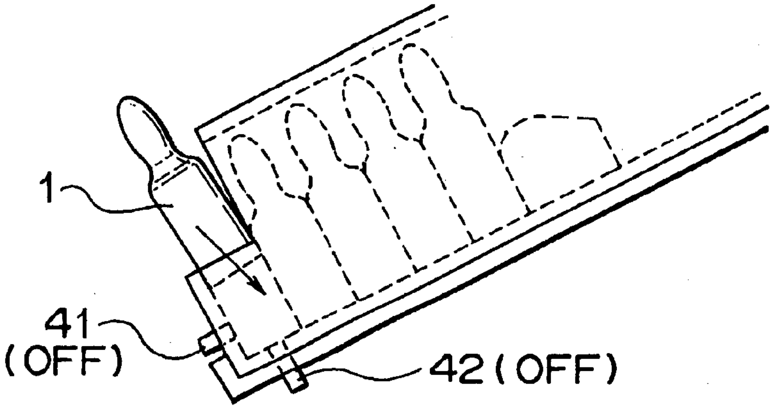
FIG. 20 is a third view showing the action of pushing the medicine container into the first medicine cassette used in the first embodiment.
Figure 21:
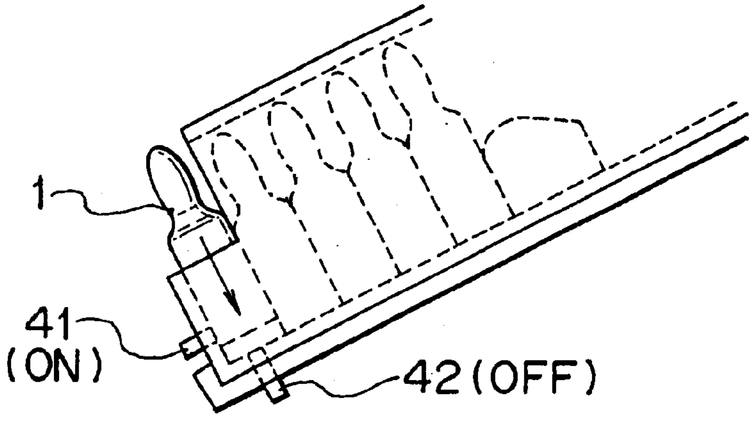
FIG. 21 is a fourth view showing the action of pushing the medicine container into the first medicine cassette used in the first embodiment.

Specifically, in the regular state as shown in FIG. 14, the sensors 41 and 42 are ON. As shown in FIGS. 15 and 16, as the forwardmost medicine container 1 is moved upward so as to be drawn out, the sensor 42 goes OFF first, and then the sensor 41 goes OFF. Subsequently, as shown in FIG. 17, as the second medicine container 1 slides to the forwardmost position, the sensor 42 goes ON first, and then the sensor 41 goes ON, thereby reestablishing the regular state.

As shown in FIGS. 18 to 21, when the new medicine container 1 which is pushed into the cassette 20 through the inlet-outlet opening 21 causes the second medicine container 1 to move rearward, the sensor 41 first goes OFF from the ON state, and then the sensor 42 goes OFF from the ON state. Subsequently, as the new medicine container 1 is inserted into the cassette 20, the sensor 41 goes ON first, and then the sensor 42 goes ON, thereby reestablishing the regular state.

The above-mentioned change in the state of detection performed by the sensors 41 and 42 is read by the detection processing means. The detection processing means interprets the change as occurrence of an action that the medicine container 1 has been drawn out or pushed in through the inlet-outlet opening 21. Since the sensors 41 and 42 go ON and OFF in different sequences according to whether the medicine container 1 has been drawn out or pushed in, the main controller 44 can reliably determine whether the medicine container 1 has been drawn out or pushed in.

When the main controller 44 detects occurrence of an action that the medicine container 1 has been drawn out, the arithmetic processing means performs an arithmetic operation so as to decrement the count value contained in the count value table 46 by one. When the main controller 44 detects occurrence of an action that the medicine container 1 has been pushed in, the arithmetic processing means increments the count value by one. The detection processing means and the arithmetic processing means constitute counting means.

Each time the medicine container 1 is drawn out from or pushed into the relevant cassette 20, the count value contained in the count value table 46 corresponding to the cassette 20 is incremented or decremented accordingly. Thus, the count value contained in the count value table 46 accurately reflects the number of the medicine containers 1 contained in the corresponding cassette 20 all the time. Accordingly, the counting means can reliably calculate the number of the medicine containers 1 contained in the cassette 20. Similarly, the counting means can reliably calculate the number of the medicine containers 2 contained in the cassette 80 on the basis of the ON-OFF operation of the sensors 41 and 42.

Since the above-mentioned counting process is performed automatically, a doctor, a nurse, or other staff in an operating room may draw out the appropriate medicine container 1 from among the medicine containers 1 stored in the cassette support member 10 whenever need for a certain injection, for example, arises. Thus, merely through performance of the simple drawing-out action, the user can immediately obtain the required medicine container 1. When use of the medicine container 1 which has been drawn out is cancelled because of, for example, a change in condition of a patient or disease, the medicine container 1 may be pushed back into the cassette 20 which contains the medicine containers 1 of the same kind, through the inlet-outlet opening 21 immediately or at some appropriate time after completion of an operation. Thus, merely through performance of the simple pushing-in action by the user, the medicine container 1 which has been drawn out, but has not been used can be returned back to an appropriate storage position according to the sequence of expiration dates and can be automatically counted.

After or during use of the medicine container 1 or 2 or the medicine containers 1 and 2, a user can anytime instruct from the keyboard 31 the main controller 44 to output data contained in the count value table 46 to the printer 32 or the floppy disk drive 33 as they are, or after conversion of the data to an appropriate format or addition of the names of medicines to the data, which are performed on the basis of the management data 47 and other data. When communication is established between the main controller 44 and, for example, a host computer via the communication unit 34, the data contained in the count value table 46 can be transmitted to the host computer.

As mentioned above, at a medical site, such as an operating room, where the medicine storage apparatus is prepared, a user can draw out the medicine container 1 or return the same back to the apparatus in a simple, quick manner without interference with the user's primary work. Furthermore, the user can accurately and anytime know the number of the medicine containers 1 stored in the medicine storage apparatus without involvement of entry of data regarding the number of the medicine containers 1 which have been drawn out from or returned back to the apparatus.

Therefore, the medicine storage apparatus does not require a user to check the amount of medicine consumed during treatment in an operating room or to enter the amount of consumed medicine into a medicine management document or into a medicine inventory control computer, thereby simplifying management of medicines.

The contents of treatment are frequently changed according to progress of surgery and condition of a patient, and medicines required for treatment vary accordingly. In this case, the required medicine container 1 is drawn out from the inlet-outlet opening 21 of the relevant cassette 20 in accordance with the arrayed sequence. Each of the medicine containers 1 which remain unused after the completion of an operation is pushed back into the corresponding cassette 20 through the inlet-outlet opening 21 to thereby be positioned at the forwardmost position of a row of the medicine containers 1. Thus, through initial arrangement of the medicine containers 1 according to the sequence of expiration dates, frequent occurrence of expiration of the medicine container 1 can be suppressed even when the medicine containers 1 are frequently drawn out from and returned back to the cassette 20.

Since the cassettes 20 are arranged while the inlet-outlet openings 21 thereof are exposed, a user can directly hold the medicine container 1 in the fingers while visually confirming the medicine container 1 and can draw out the medicine container 1 from or can push the same back into the cassette 20 in a single motion, without involvement of an indirect motion, such as a switch operation. Thus, the medicine storage apparatus simplifies the operation of a user for taking out the required medicine container 1 from and returning the remaining medicine container 1 back to the cassette 20, thereby enabling prompt supply of required medicines.

Since the inlet-outlet opening 21 of the cassette 20 is easily accessible to view, and the cassette 20 permits the medicine container 1 to be readily drawn out from and returned back to the same, the medicine storage apparatus can contain a large number of cassettes 20 without involvement of damage to convenient design for use. Furthermore, each time the medicine containers 1 are drawn out from or returned back to the cassettes 20, the counting means calculates the number of the medicine containers 1 contained in each of the cassettes 20. Thus, even when the interior of the cassettes 20 is invisible or poorly visible, a user can accurately know the condition of storage of the medicine containers 1 in real time.

The counting means also calculates the number of the medicine containers 2 stored in the cassettes 80, which are adapted to contain large items of medicine, as well as the number of the medicine containers 2 which have been consumed. A user can also accurately know the condition of storage of the medicine containers 2 in the cassettes 80 in real time.

Since a user can accurately know the number of the medicine containers 1 and 2, the user can reliably and promptly replenish the medicine storage apparatus with the medicine containers 1 and 2 on the basis of the latest data regarding storage of the medicine containers 1 and 2 in the apparatus.

Since the medicine storage apparatus can be replenished with the medicine containers 1 (2) before the cassette 20 (80) becomes empty, required medicines can be supplied easily.

Since the sensors 41 and 42 of the same type are used for the cassettes 20 and 80, the same method can be used for detecting the medicine containers 1 and 2, thereby simplifying the configuration of the control system 40.

Since there is no need for disposing a sensor for each of the medicine containers 1 for detection of the medicine containers 1, the cost of the medicine storage apparatus can be lowered. Additionally, the number of the medicine containers 1 to be stored in the medicine storage apparatus can be increased. The medicine storage apparatus does not employ a method for calculating the number of the medicine containers 1 which is based on the total weight of the medicine containers 1 and the unit weight of the medicine container 1, thereby improving accuracy in calculating the number of the medicine containers 1.

The cassettes 20 are divided into a plurality of groups, each of which is composed of an appropriate number of the cassettes 20. Each group of the cassettes 20 are arranged on the corresponding cassette holder 14 Thus, the medicine containers 1 can be loaded into and unloaded from the medicine storage apparatus on a cassette holder 14 basis. Therefore, the cassette holders 14 and the cassettes 20 of a plurality of types are prepared so as to be compatible with an operation to be performed. At a convenient site other than an operating room, the cassettes 20 are batch replenished with the required medicine containers 1, and postprocessing is performed. The medicine containers 1 can be transferred on a cassette holder 14 basis between a preparation site and an operating room. Also, the medicine containers 1 can be batch loaded into and batch unloaded from the medicine storage apparatus on a cassette holder 14 basis. As a result, at the preparation site, no mistake arises in replenishing the cassette 20 with the medicine containers 1. At the operating room, preparation for an operation can be carried out simply and quickly.

A site where the medicine storage apparatus is used is not limited to an operating room. The medicine storage apparatus can be used at any site within a hospital or a pharmacy, such as an operation anteroom, a treatment room, a contrast radiography room, a nurse center, an inpatient ward, an outpatient ward, or a prescription department.

Next, a second embodiment of the present invention will be described. Structural features common to the first embodiment are denoted by common reference numerals, and repeated description thereof is omitted.

Figure 22:
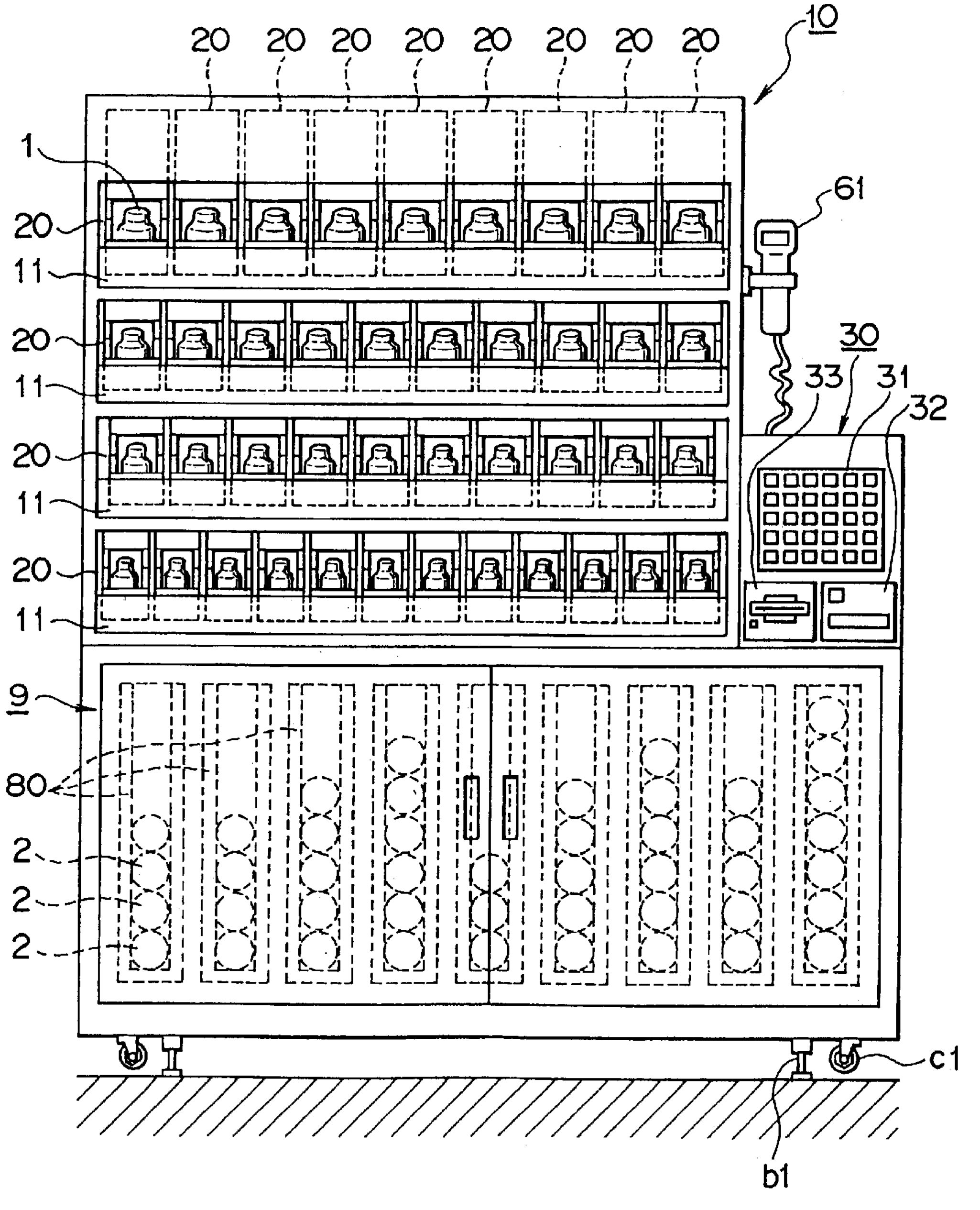
FIG. 22 is a front view of a medicine storage apparatus according to a second embodiment of the present invention.

As shown in FIG. 22, a bar code reader 61, which serves as a reading apparatus, is externally connected to the operation unit 30 via, for example, a flexible cable. A buzzer 62 is disposed so as to audibly inform a user of, for example, completion of reading by the bar code reader 61 or the result of judgment, which will be described later.

Figure 23:
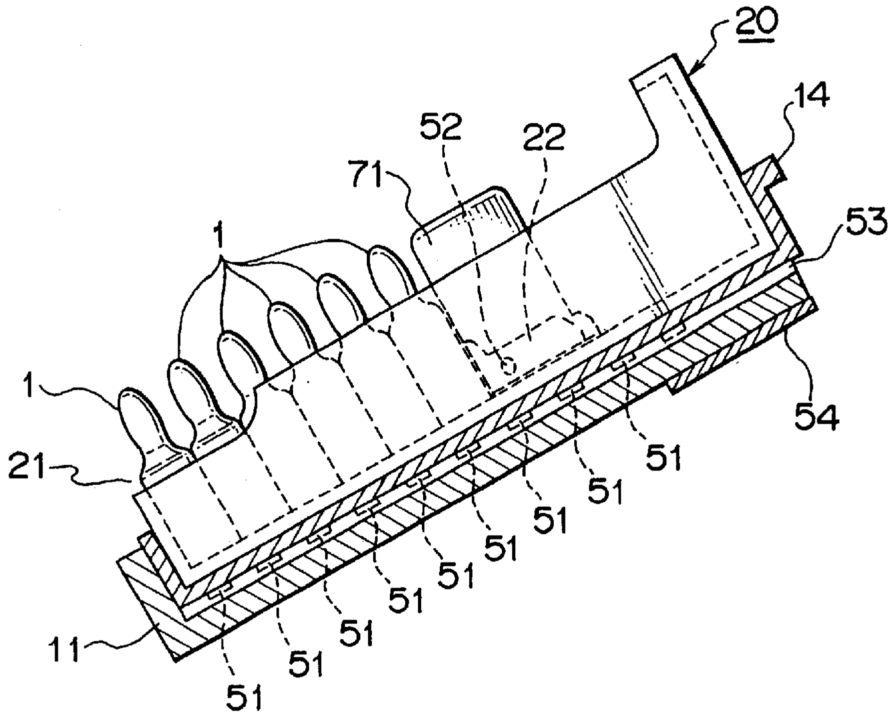
FIG. 23 is a sectional view showing the state of disposition of a first medicine cassette in the second embodiment.

A control system 50 includes a detection section composed of a plurality of sensors 51 and at least one object-under-detection 52, and an arithmetic section composed of a main controller 56, in order to calculate the number of the medicine containers 1 stored in the cassettes 20. As shown in FIG. 23, the detection section employs a magnetic detection technique, which is unlikely to be affected by contamination. The object-under-detection 52 is composed of a small permanent magnet and embedded in the weight 22, which serves as an object-under-detection holder member. The cassette holder 14 is formed from a material which does not intercept magnetism, such as plastic. The detection section may employ a photo-detection technique, a capacity-change detection technique, a contact detection technique, or like technique in place of the magnetic detection technique.

A magnetic sensor, such as a Hall device, which responds to the object-under-detection 52 is used as the sensor 51. A required number of the object-under-detection 52 is small, whereas a required number of the sensors 51 is large. Thus, in order to lower the unit price of the sensor 51, a function imparted to the sensor 51 is to go ON or OFF according to the distance to the object-under-detection 52. In order to eliminate the necessity of connection to the cassette 20, the sensors 51 are stuck in a row on, for example, the upper surface of a sensor substrate 53. The number of the sensors 51 is greater by one than the maximum number of the medicine containers 1 to be contained in the cassette 20. The sensors 51 is arranged at pitches equal to those of the medicine containers 1 stored in the cassette 20.

Figure 24:
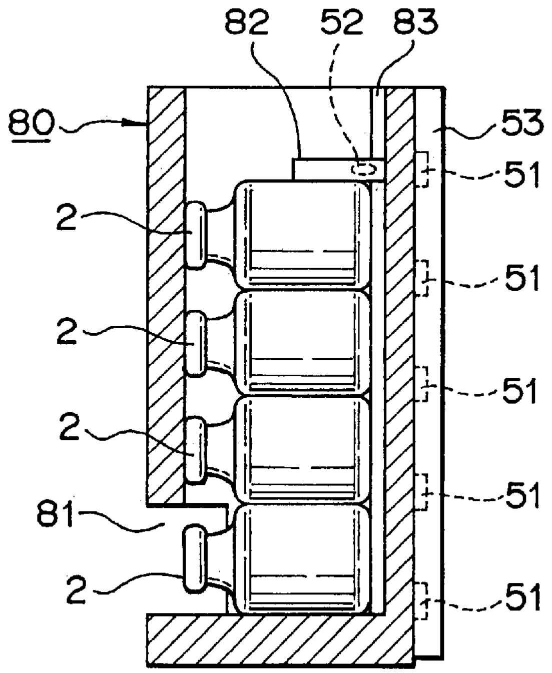
FIG. 24 is a sectional view of a second medicine cassette used in the second embodiment.

As shown in FIG. 23, the sensor substrate 53 is mounted on the upper surface of the cassette shelf 11. When the cassette 20 is disposed in place on the cassette shelf 11, the sensors 51 are located just under the corresponding medicine containers 1. As shown in FIG. 24, the sensor substrate 53 is also mounted on the rear surface of the cassette 80. In this state, the sensors 51 are disposed at pitches which are each equal to the diameter of the medicine container 2 and at obliquely upward positions with respect to the corresponding medicine containers 2 as well as at the position corresponding to a bottom portion of the cassette 80. A guide path 83 is formed in an internal space of the cassette 80 where the medicine containers 2 are stored. An object-under-detection holder member 82 for holding the object-under-detection 52 is disposed within the cassette 80 in such a manner as to be slidable along the guide path 83.

The sensor substrate 53 is disposed for each of the cassettes 20 and 80. By contrast, a subcontroller substrate 54 is disposed for each of the cassette shelves 11 and for the base member 9. Specifically, the subcontroller substrate 54 is attached to the lower surface of the cassette shelf 11 so as to extend along the length of the cassette shelf 11. Also, the subcontroller substrate 54 is attached to, for example, the rear panel of the base member 9 so as to extend along the length of the rear panel. The subcontroller substrates 54 are connected to the sensor substrates 53 and the main controller 56 via connectors (not shown). A subcontroller 55, such as a one-chip microcomputer, is mounted on each of the subcontroller substrates 54. Through relaying process, the subcontroller 55 collects detection results transmitted from the sensors 51 and transmits the collected data to the main controller 56.

The main controller 56 calculates the number of the medicine containers 1 and 2 as programmed, on the basis of the results of detection by the sensors 51. Specifically, the detection processing means (not shown) of the main controller 56 receives the results of detection by all of the sensors 51 via the subcontrollers 55, which are disposed in one-to-one correspondence with respect to the cassette shelves 11. On the basis of the results of detection by the sensors 51, the detection processing means determines whether or not the medicine containers 1 (2) are drawn out from or returned back to the corresponding cassettes 20 (80). On the basis of the results of detection by the sensors 51, the arithmetic processing means (not shown) of the main controller 56 calculates the number of the medicine containers 1 (2) contained in the cassettes 20 (80). Count value tables 58 stored on an incorporated or external hard disk (HD) 57 are allocated to the corresponding cassettes 20 and 80. A counted number of the medicine containers 1 (2) stored in each of the cassettes 20 (80) is recorded on the corresponding count value table 58. The detection processing means and the arithmetic processing means constitute counting means.

Each time the main controller 56 receives data read by the bar code reader 61, the main controller 56 judges whether or not reading has been performed properly, and causes the buzzer 62 to beep according to the result of judgement. In this case, for example, the buzzer 62 beeps in a short period of time, and the tone color of the beep is changed depending on the result of judgement. In the case where reading has been performed properly, the main controller 56 judges whether or not the medicine containers 1 and 2 are properly stored in the corresponding cassettes 20 and 80, through collation of the read data with management data 59 stored on the hard disk 57. The main controller 56 causes the buzzer 62 to beep according to the result of judgement. In order that a user can clearly hear beeping and can readily interpret the result of judgement, for example, the tone color of the beep is caused to differ from the above-mentioned tone color and depending on the result of judgment, or the number of intermittent beeps is caused to differ depending on the result of judgement. In this case, the buzzer 62 beeps for a long period of time.

Figure 25:
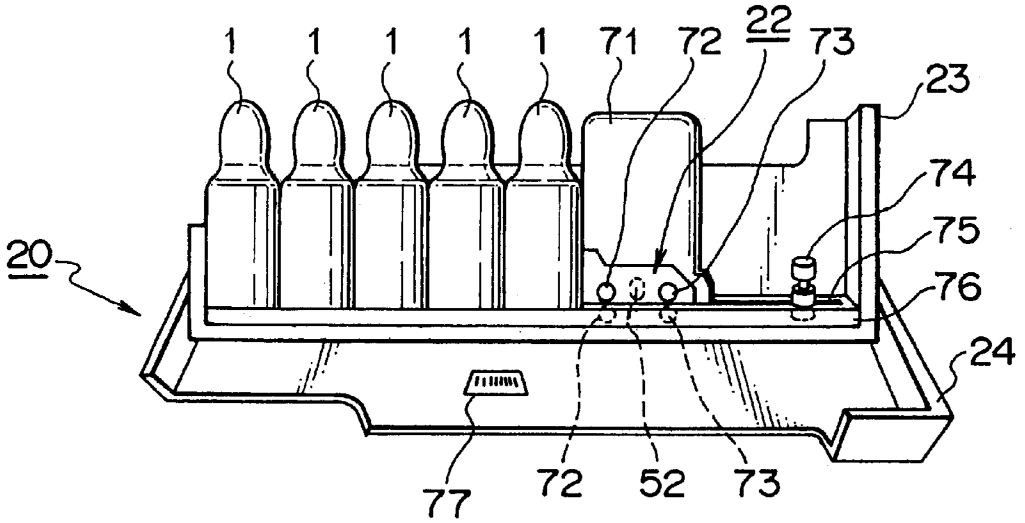
FIG. 25 a view showing the first medicine cassette used in the second embodiment which is opened for batch replenishment of medicine.
Figure 26:
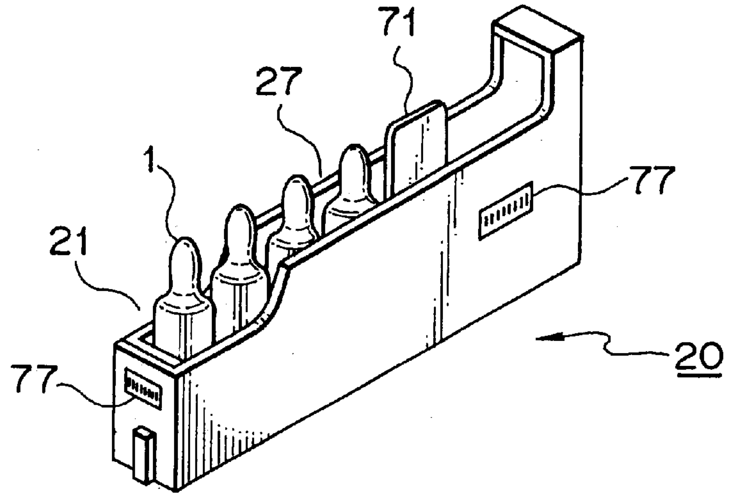
FIG. 26 is a perspective view of the first medicine cassette used in the second embodiment.

Next, the cassette 20 will be described with reference to FIGS. 25 and 26.

In the cassette 20, the inlet-outlet opening 21 and a replenishment port 27 are integrally formed into a large opening. Accordingly, even when the cassettes 20 are arranged in a dense state, the cassette 20 can be replenished with the medicine containers 1 from above. Also, there is no need for a user to take out the cassettes 20 one by one from a densely arranged group of the cassettes 20 for replenishment. For example, the cassette 20 can be replenished with the medicine containers 1 while being held, together with other cassettes 20, in the cassette holder 14, whereby preparation work can be simplified.

A guide member 76 is disposed on an inner bottom portion of the cassette 20. A stopper 74, which serves as range limitation means, is disposed on the guide member 76. A protrusion 71, which serves as a manual operation member, and wheels 72 and 73, which serve as inclined-movement restraint means, are disposed on the weight 22. The guide member 76 is formed from, for example, a hollow rectangular bar of aluminum, an aluminum channel, or an aluminum L-shaped angle bar. The guide member 76 provides a guide groove 75, which extends along an array path for the medicine containers 1 within the cassette 20.

A lower portion of the weight 22 is inserted into the guide groove 75. A pair of wheels 72 and a pair of wheels 73 are disposed rotatably on a lower portion of the weight 22 at two positions in such a manner as to hold a horizontal portion of the guide member 76 therebetween. The lower wheels 72 and 73 are disposed within the guide groove 75, whereas the upper wheels 72 and 73 are disposed outside the guide groove 75. Thus, the weight 22 moves in the front-rear direction; i.e., along the array path for the medicine containers 1, while being guided by the guide groove 75 and while an inclination thereof is restrained by means of the wheels 72 and 73.

The stopper 74 includes a nut, which is located within the guide groove 75 while rotation thereof is restrained, and a bolt, which extends in the vertical direction; i.e., perpendicularly to the guide groove 75. Through rotation of a knob projecting from the guide groove 75 with, for example, fingers, a user can fix the stopper 74 onto the guide member 76 or can loosen and move the stopper 74 to another position of fixation. When the weight 22 comes into contact with the stopper 74 fixed to the guide member 76, the weight 22 cannot move further beyond the stopper 74. In this manner, the stopper 74 limits the range of movement of the weight 22.

The maximum storable number of the medicine containers 1 corresponds to the range of movement of the weight 22. Therefore, at the time of batch replenishment, which encounters difficulty in automatically counting the number of the medicine containers 1, a worker can replenish the cassette 20 with a required number of the medicine containers 1, through a simple operation of filling the accommodation space of the cassette 20 with the medicine containers 1, without counting them.

When the medicine containers 1 are to be prepared at a medical site, fixed number disposition is often performed. Specifically, in preparation work to be carried out prior to medical practices, a predetermined number of the medicine containers 1 are prepared for each type of medicine. In such a case, the range of movement of the weight 22 is determined so as to correspond to a predetermined number of the medicine containers 1 associated with fixed number disposition, thereby lessening a burden on a worker engaged in replenishment with respect to the medicine containers 1. Even when replenishment work involves incomplete or insufficient replenishment, after the cassettes 20 are loaded into the medicine storage apparatus, the number of the medicine containers 1 stored in the corresponding cassettes 20 can be obtained accurately and automatically through counting by the counting means.

Bar code labels 77 are stuck on the cassette 20 at positions which are readily accessible by the bar code reader 61 for reading; for example, front face, inner surface of a side wall, and outer surface of a side wall. The bar code label 77 contains identification information, such as a medicine code allocated on the basis of, for example, the type of the medicine container 1. Usually, the bar code label 77 contains identification information equal to that contained in a bar code label (not shown) stuck on the medicine container 1 to be stored in the cassette 20. The bar code label 77 stuck on the outer surface of a side wall enables reading of identification information from the cassette 20 which has been unloaded from the cassette shelf 11 or from the cassette holder 14. The bar code label 77 stuck on the inner surface of a side wall enables reading of identification information from the opened cassette 20. The bar code label 77 stuck on the front face enables reading of identification information from the cassette 20 which is placed on the cassette shelf 11.

Also, the bar code label 77 is stuck on the cassette holder 14 at a position which is readily accessible by the bar code reader 61 for reading; for example, outer peripheral surface. The bar code label 77 contains identification information, such as a holder number allocated to the cassette holder 14 for identification. In order to cope with use of the bard code label 77, data sets which are equal in number to the number of the cassette holders 14 are recorded. Each data set includes the management data 59, identification information of the corresponding cassette holder 14, and identification information of a plurality of cassettes 20 held by the cassette holder 14.

The present embodiment uses a bar code for representing identification information, but may use other code, such as characters or symbols. A reading apparatus for reading identification information represented by a code other than a bar code may assume the form of, for example, a character reader, such as an OCR, or a combination of an image pickup apparatus, such as a CCD camera, and an image processor. Notification means for notifying a user of the result of judgment is not limited to a buzzer which beeps, but may assume the form of a speaker which produces a synthetic voice or a display which displays characters or an image.

Figure 29:
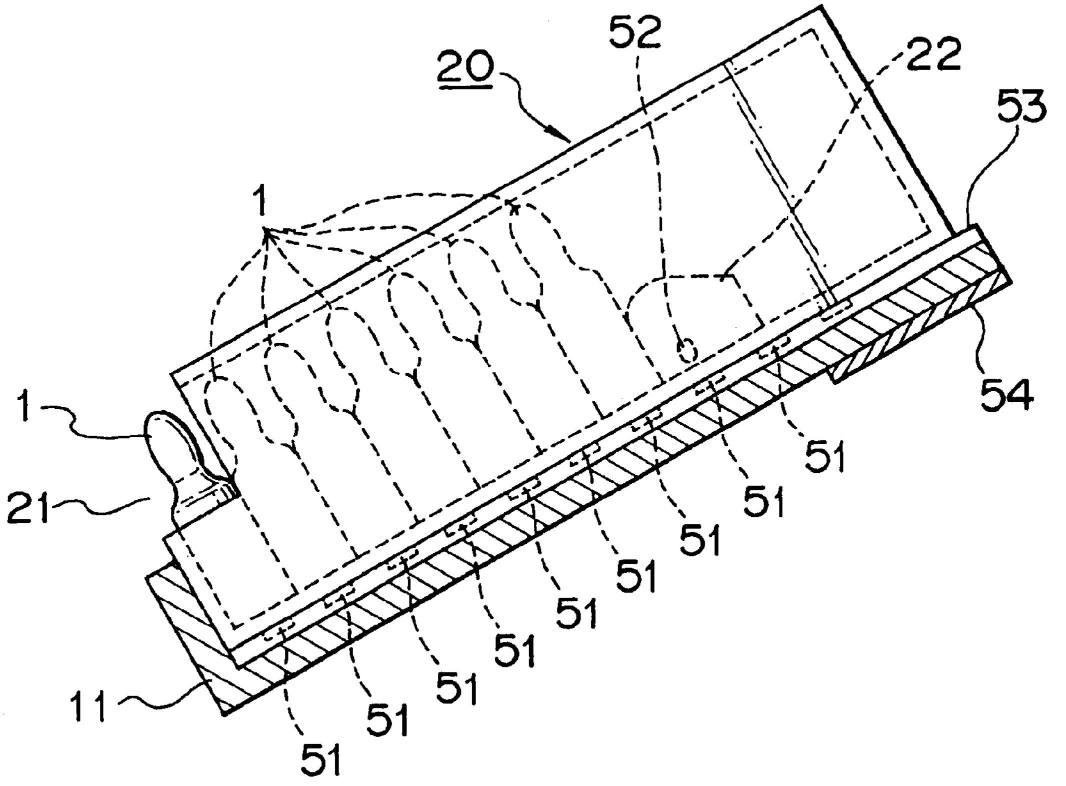
FIG. 29 is a view showing the state of disposition of a modification of the first medicine cassette used in the second embodiment.

As shown in FIG. 29, the cassette shelf 11 may directly support the cassette 20 without employment of the cassette holder 14.

Next will be described the operation of the medicine storage apparatus having the above-described configuration.

Figure 27:
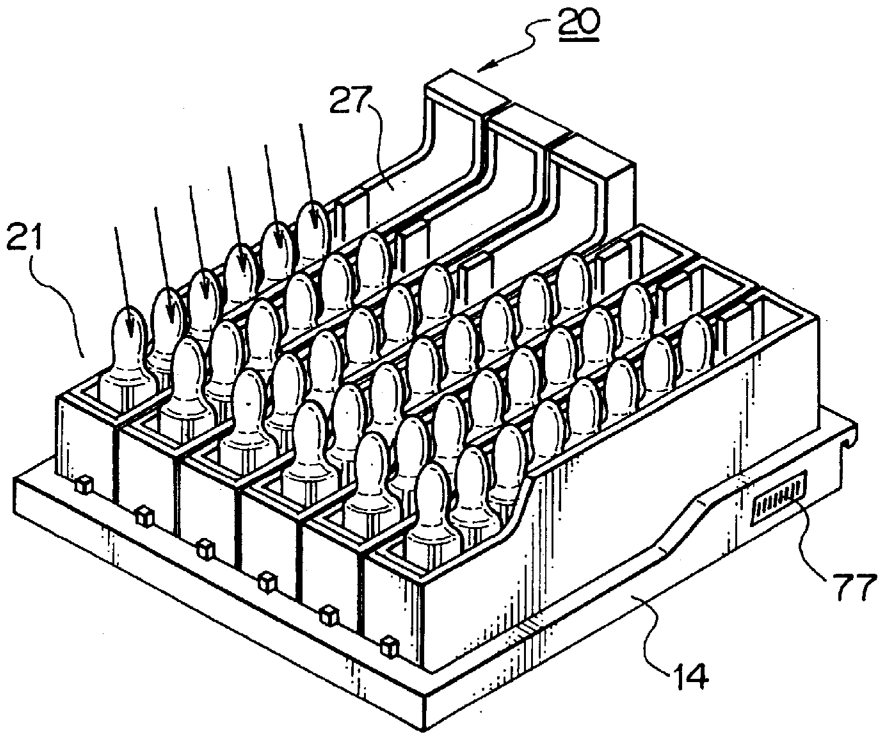
FIG. 27 is a perspective view showing a cassette holder loaded with cassettes used in the second embodiment.
Figure 28:
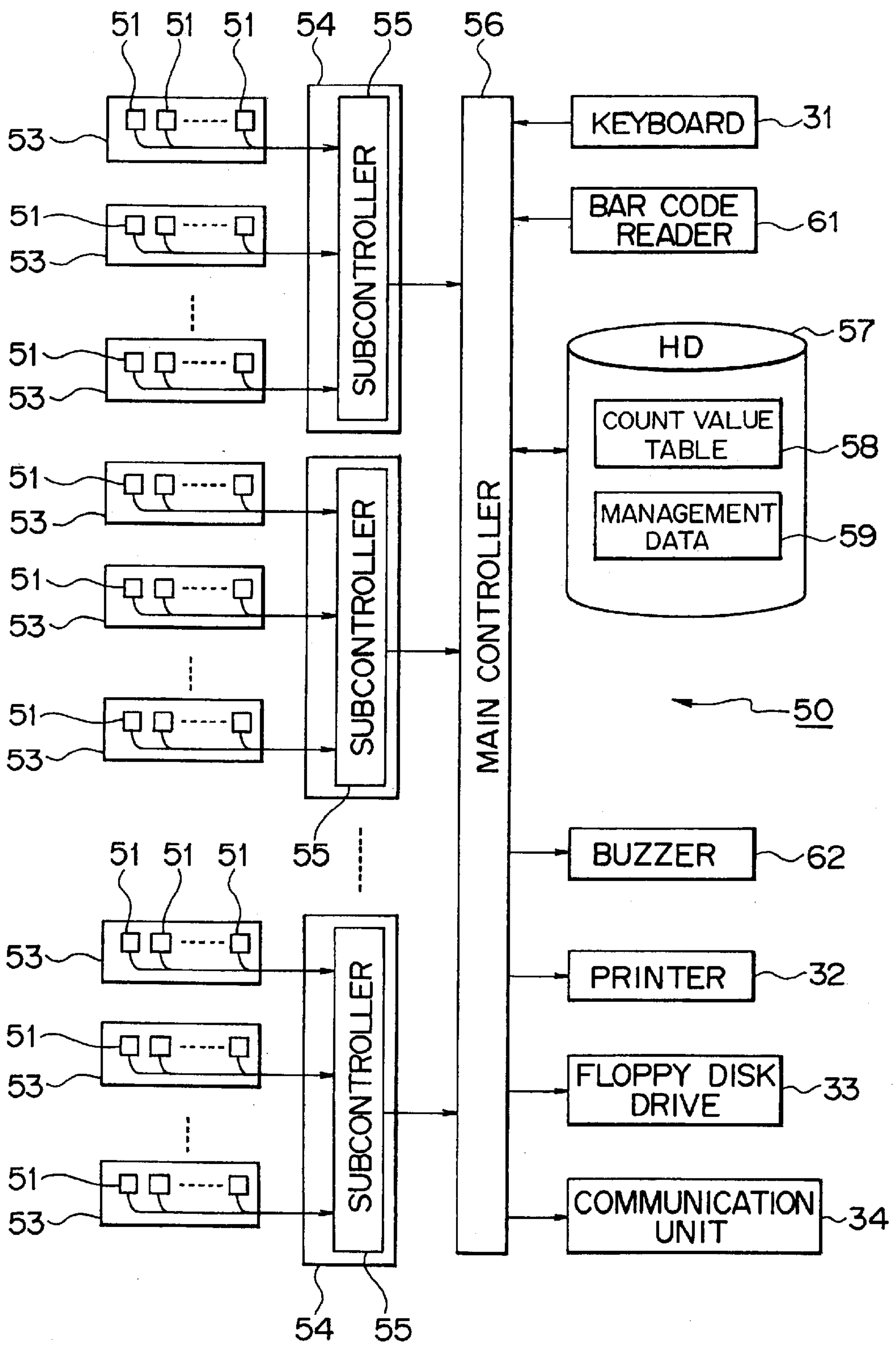
FIG. 28 is a block diagram of a control system for the medicine storage apparatus according to the second embodiment.

In a preparation stage before use of the medicine storage apparatus is started, entry of data for initializing the count value table 58 (FIG. 28) is not perfornmed. As shown in FIG. 25, the cassette 20 can be opened for batch replenishment with the medicine containers 1. Also, as shown in FIG. 26, the cassette 20 in a closed state can be replenished with the medicine containers 1 through the replenishment port 27 as needed. Since the replenishment port 27 opens upward, as shown in FIG. 27, the cassette 20 can be replenished with the medicine containers 1 while resting on the cassette holder 14.

Accordingly, a combination of the cassettes 20 can be arranged beforehand on the cassette holder 14 for, for example, fixed number disposition. Also, the cassettes 20 can undergo batch replenishment on a cassette holder 14 basis. Thus, replenishment work can be simplified further.

When the cassettes 20 are to undergo batch replenishment so as to establish fixed number disposition, the following procedure is followed, irrespective of whether the cassettes 20 are opened or closed. The position of fixation of the stopper 74 is adjusted beforehand. The protrusion 71 is lightly pushed with a finger so as to move the weight 22 rearward until the weight 22 comes into contact with the stopper 74, thereby forming a space for storing a predetermined number of the medicine containers 1. The medicine containers 1 are pushed into the cassettes 20 so as to fill the space extending between the inlet-outlet opening 21 and the front end face of the weight 22. Thus, the cassette 20 can be reliably replenished with a required number of the medicine containers 1. When the protrusion 71 is pushed so as to move the weight 22, the weight 22 does not incline or fall.

The medicine containers 1 which can be readily identified by, for example, color, shape, or labeled name can be immediately pushed into the relevant cassettes 20. However, in the case of the medicine containers 1 which cannot be reliably identified due to difficulty in visually checking a labeled name or uncertainty about visual identification, compatibility between the medicine containers 1 and the cassettes 20 cannot be determined.

In such a case, a user reads a bar code label on the medicine container 1 concerned and the bar code label 77 on the cassette 20 by use of the bar code reader 61 so as to transmit the read data to the main controller 56. The user repeats the same reading operation. On the basis of the read data obtained through the two reading operations, the main controller 56 verifies whether the bar code reader 61 functions properly. Specifically, the main controller 56 judges whether the data obtained through the first reading operation matches the data obtained through the second reading operation. When the former data matches the latter data, the main controller 56 causes the buzzer 62 to beep for notification. Thus, the user can reliably determine whether or not the medicine container 1 is compatible with the cassette 20. When the data obtained through the first reading operation does not match the data obtained through the second reading operation, the user reads the bar code label on the medicine container 1 and the bar code label 77 on another cassette 20 by use of the bar code reader 61. The user repeats the same reading operation. On the basis of the read data obtained through the two reading operations, the main controller 56 verifies again whether the bar code reader 61 functions properly. Thus, the cassette 20 can be replenished with the medicine containers 1 in simple operation without error.

Similarly, when the user cannot determine whether the cassette 20 is compatible with the cassette holder 14 on which the user is about to place the cassette 20, the user reads the bar code labels 77 on the cassette 20 and on the cassette holder 14 by use of the bar code reader 61 so as to transmit the read data to the main controller 56. Also, in this case, on the basis of the read data obtained through the two reading operations, the main controller 56 verifies whether the bar code reader 61 functions properly.

When the cassette holder 14 loaded with the cassettes 20 replenished with the medicine containers 1 is placed on the cassette shelf 11, the arithmetic processing means automatically counts the number of the medicine containers 1. When the management data 59, for example, includes verification data regarding fixed number disposition, the main controller 56 automatically collates the count data with the verification data. Thus, on the basis of the result of the collation, further replenishment, if needed, can be performed easily and promptly.

Next will be described the function for detecting a user's operation for drawing out the medicine container 1 from or pushing the same back into the cassette 20.

Figure 30:
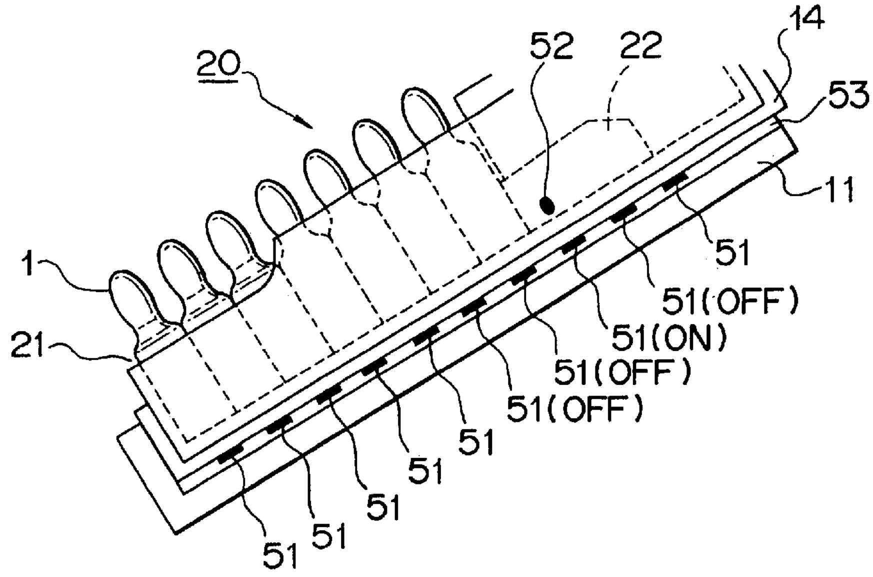
FIG. 30 is a first view showing an action of loading or unloading of a medicine container in the second embodiment.

When the operation of the medicine storage apparatus is started, the sensors 51 associated with each of the cassettes 20 operate as shown in FIG. 30. Specifically, the sensor 51 corresponding to the object-under-detection 52 goes ON, whereas other sensors 51 go OFF. On the basis of the position of the sensor 51 which has gone ON, in a row of the sensors 51, the number of the medicine containers 1 stored in the cassette 20 can be calculated. The thus-calculated count value is written into the count value table 58.

Figure 31:
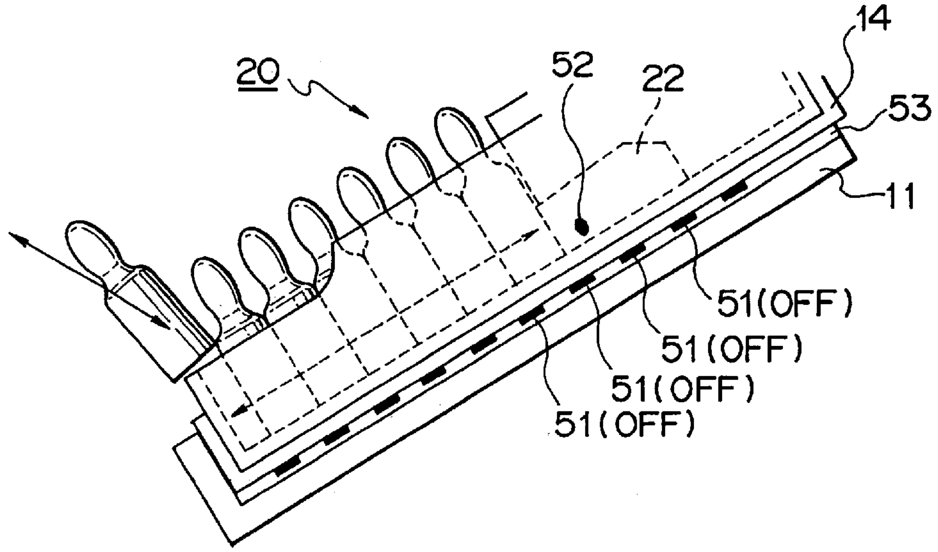
FIG. 31 is a second view showing the action of loading or unloading of a medicine container in the second embodiment.
Figure 32:
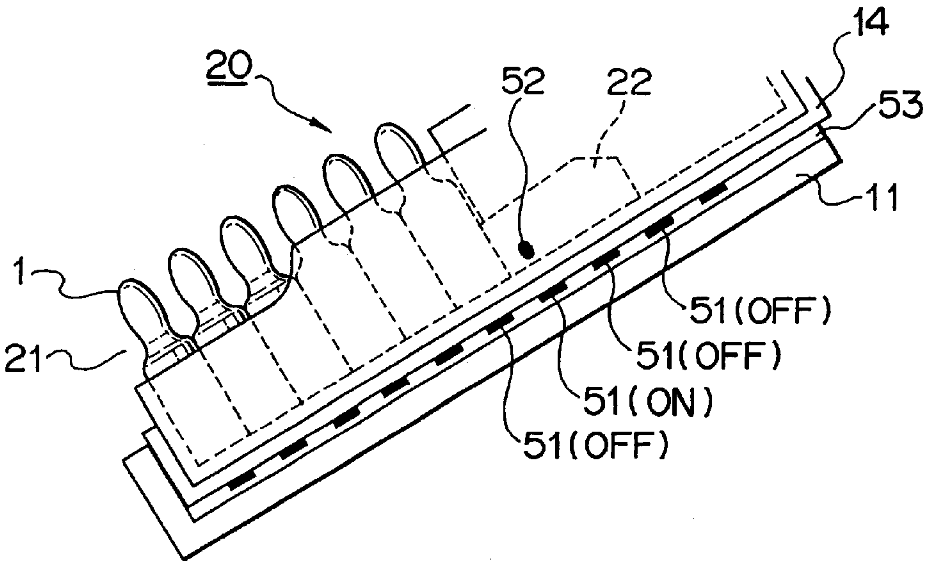
FIG. 32 is a third view showing the action of loading or unloading of a medicine container in the second embodiment.

When the forwardmost medicine container 1 is drawn out, the second and subsequent medicine containers 1 and the weight 22 shift by one pitch toward the inlet-outlet opening 21. As shown in FIG. 31, during the shift, all of the sensors 51 momentarily go OFF. Upon completion of shift by one pitch, as shown in FIG. 32, the sensor 51 next to the last ON sensor 51 (on the side of the inlet-outlet opening 21) goes ON. In the state shown in FIG. 32, when the medicine container 1 is pushed in through the inlet-outlet opening 21, the medicine containers 1 and the weight 22 shift rearward by one pitch. As a result, the sensor 15 next to the last ON sensor 51 (on the rearward side) goes ON.

Thus, the position of the object-under-detection 52 located behind the rearmost medicine container 1 stored in each of the cassettes 20 can be detected accurately all the times without being influenced by a user's action for drawing out the medicine container 1 from or pushing the same into the cassette 20. Similarly, the number of medicine containers 2 stored in the cassette 80 can be calculated accurately.

Accordingly, regardless of where the medicine storage apparatus is used and at any stage, there is no need for a user to enter data, such as the number of the medicine containers 1 to be stored. Also, the user can know the number of the medicine containers 1 stored in the apparatus accurately all the time.

In addition to the effect of the first embodiment, another effect is produced through use of the bar code reader 61. Specifically, the user can be reliably prevented from mistakenly returning to a wrong cassette 20 the medicine container 1 which has been drawn out, but remains unused. During, for example, operation, the user may return the medicine container 1 back to the cassette 20 merely in the following limited cases: the user attempts to return the medicine container 1 immediately after drawing out the medicine container 1, so that the destination cassette 20 is reliably known; and the medicine container 1 is reliably identifiable by color and shape. When any uncertainty is involved or when the user is busy, the user may keep the medicine container 1 in, for example, a predetermined tray until an operation is completed. After the operation is completed, the user may return the medicine container 1 back to the relevant cassette 20 while making sure of identification information regarding the medicine container 1 by use of the bar code reader 61.

In contrast to the first embodiment, detection of the forwardmost medicine container 1 is not required. A user may draw out the medicine containers 1 from or places the same into the cassette 20 one by one or in batches. Also, the user may perform such actions quickly or slowly. Calculation of the number of the medicine containers 1 stored in the cassette 20 can be free from influence of transitional conditions involved in such actions, since the calculation is performed in a static condition. Thus, the calculation is accurate all the time.

Since calculation of storage quantity is performed as needed regardless of delivery or reception of the medicine container 1 and in terms of the total number of the medicine containers 1 contained in the cassette 20, setting of an initial value becomes unnecessary. Also, the calculation does not suffer remaining of an occasional calculation error or accumulation of calculation errors. Thus, a user can know the condition of storage of the medicine containers 1 easily and accurately.

In the present embodiment, the sensors 51 are disposed just under the corresponding medicine containers 1. However, the sensors 51 may positionally deviate from the corresponding medicine containers 1 so long as the object-under-detection 52 is positioned substantially just above any one of the sensors 51. For example, when the distance between the rearmost medicine container 1 and the object-under-detection 52 differs from a pitch between the medicine containers 1, the relative position between the medicine container 1 and the sensor 51 is adjusted by the difference. In the present embodiment, the sensors 51 are disposed below the object-under-detection 52. However, for example, the following arrangement may be acceptable. The sensors 51 are disposed on the lower surface of the cassette shelf 11. The weight 22 is rendered as high as or higher than the medicine container 1. An object-under-detection is disposed on the upper end of the weight 22.

In the present embodiment, the position of the object-under-detection 52 disposed within the weight 22 is detected in terms of a physical quantity corresponding to the position of the rear end of the row of the medicine containers 1 stored in the cassette 20. However, since the number of the medicine containers 1 stored in the cassette 20 can be accurately calculated by dividing the length of the row by the pitch of arrangement of the medicine containers 1, the length of the row of the medicine containers 1 may be detected. In this case, the length of the row of the medicine containers 1 may be measured through direct measurement of the distance between the front end and the rear end of the row of the medicine containers 1 or may be indirectly obtained through detection of the distance of movement of the weight 22.

Next will be described a third embodiment of the present invention capable of accurately determining the length of the row of the stored medicine containers 1 and the number of the stored medicine container 1 in either case of storing the medicine containers 1 of small size in the cassette 20 or storing the medicine containers 1 of large size in the cassette 20. Structural features common to the second embodiment are denoted by common reference numerals, and repeated description thereof is omitted.

Figure 33:
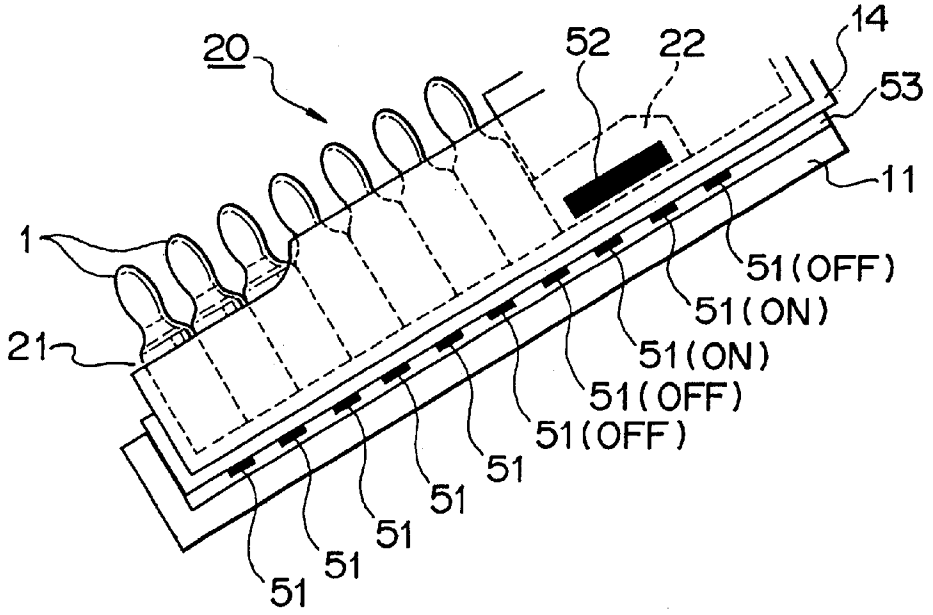
FIG. 33 is a view showing a medicine cassette loaded with medicine containers of small size in a third embodiment of the present invention.
Figure 34:
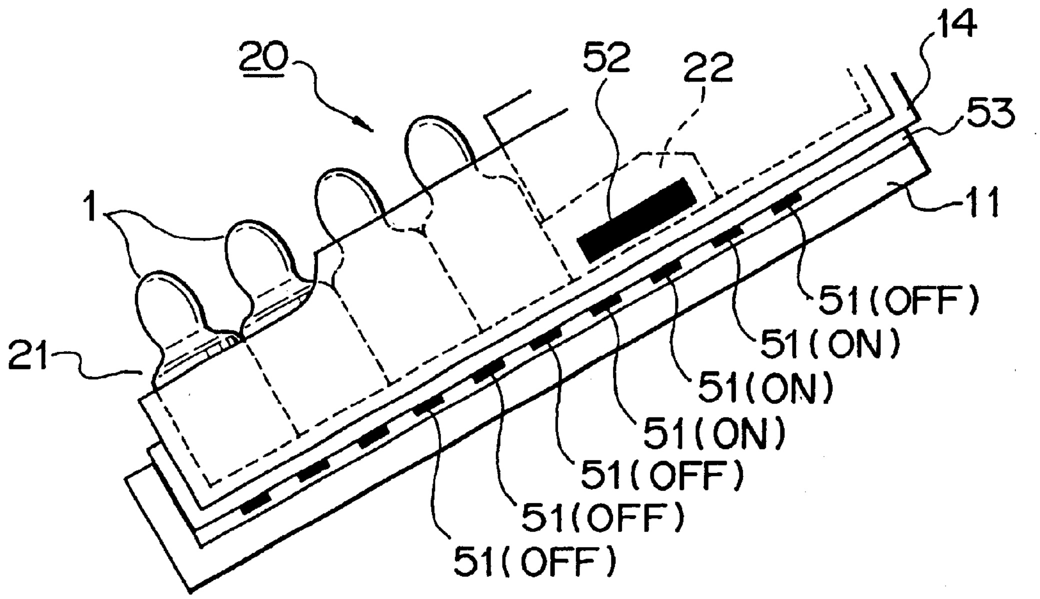
FIG. 34 is a first view showing the medicine cassette loaded with medicine containers of large size in the third embodiment.
Figure 35:
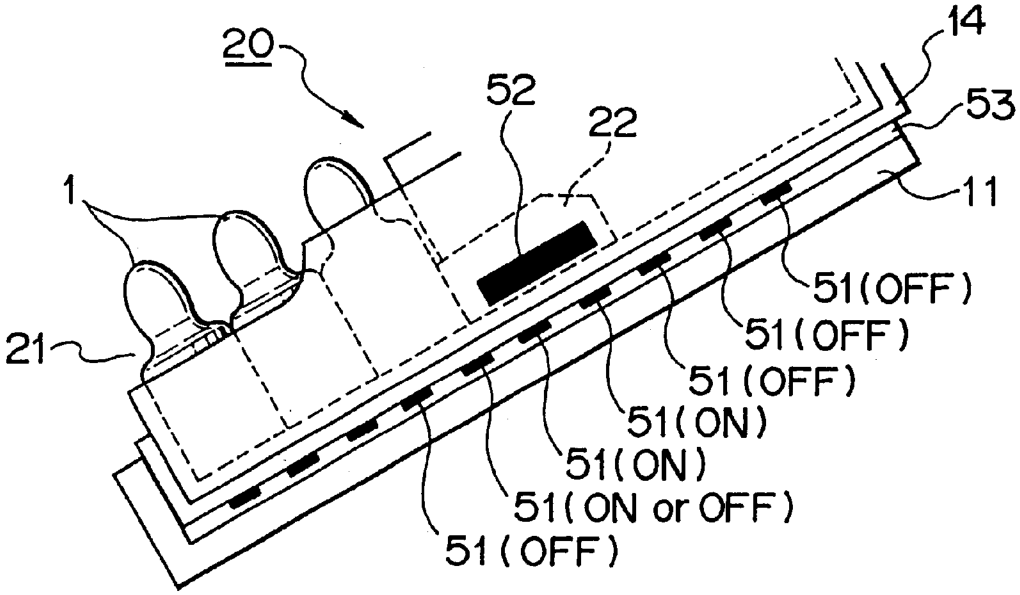
FIG. 35 is a second view showing the medicine cassette loaded with medicine containers of large size in the third embodiment.

As shown in FIG. 33, when the medicine containers 1 of small size are stored in the cassette 20, the sensors 51 are arranged such that the medicine containers 1 and the sensors 51 are arranged at the same pitch. Accordingly, as shown in FIGS. 34 and 35, when the medicine containers 1 of large size are stored in the cassette 20, the medicine containers 1 and the sensors 51 are arranged at different pitches. The range in which the object-under-detection 52 can be detected is determined so as to be longer than the pitch of arrangement of the sensors 51 and so as not to become an integral multiple of the pitch of arrangement of the sensors 51.

When the medicine containers 1 of small size are stored in the cassette 20, the pitch of the medicine containers 1 becomes equal to that of the sensors 51. Accordingly, as in the case of the second embodiment, the length of the row of the medicine containers 1 and the number of the medicine containers 1 can be calculated accurately. When the medicine containers 1 of large size are stored in the cassette 20, the pitch of the medicine containers 1 does not become equal to that of the sensors 51. However, when the medicine container 1 is loaded into or unloaded from the cassette 20, the object-under-detection 52 moves along a distance longer than one pitch of arrangement of the sensors 51.

Thus a change in the length of the row of the medicine containers 1 can be reliably detected. When the pitch of the medicine containers 1 does not become equal to that of the sensors 51, the sensor 51 which responds to the front end of the object-under-detection 52 may become unidentifiable in some case. Even in such a case, since the length of the object-under-detection 52 differs from an integral multiple of the pitch of arrangement of the sensors 51, the sensor 51 which responds to the rear end of the object-under-detection 52 is definitely identified. Thus, an ON-OFF pattern which a plurality of the sensors 51 exhibit can be related to the length of a row composed of a predetermined number of the medicine containers 1 and to the number of the medicine containers 1 whereby the length of the row of the medicine containers 1 and the number of the medicine containers 1 arranged in a row can be calculated accurately.

The common sensors 51 and the common object-under-detection 52 can be used for the case where the medicine containers 1 of small size are stored in the cassette 20 and for the case where the medicine containers 1 of large size are stored in the cassette 20. Thus, the sensor substrate 53 can be used in common to the medicine containers 1 of different sizes, thereby lowering the cost of the medicine storage apparatus.

The length of the row of the medicine containers 1 and the number of the medicine containers 1 arranged in a row may be calculated through execution of arithmetic operations in the subcontrollers 55 (FIG. 28) and the main controller 56 (FIG. 28) each time detection is performed by means of the sensors 51 and the object-under-detection 52, However, the following alternative method may also be acceptable. The length of the row of the medicine containers 1 and the number of the medicine containers 1 arranged in a row are calculated beforehand and stored on the hard disk in the form of a table, such as a judgment table. The subcontroller 55 and the main controller 56 reference, for example, the judgment table to thereby determine the length of the row of the medicine containers 1 and the number of the medicine containers 1 arranged in a row. In this case, processing to be executed each time detection is performed by means of the sensors 51 and the object-under-detection 52 is a mere retrieval, which is light-load processing.

The sensors 51 may be arranged at pitches corresponding to the arrangement of the medicine containers 1 of small size in common among the sensor substrates 53. Alternatively, a plurality of different pitches may be employed.

Next, a fourth embodiment of the present invention will be described.

Figure 36:
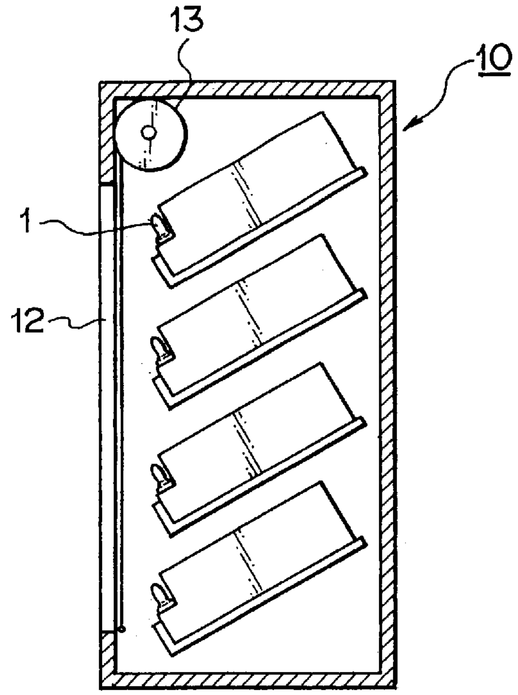
FIG. 36 is a sectional view of a cassette support member used in a fourth embodiment of the present invention.

As shown in FIG. 36, in order to store the medicine containers 1 which are preferably stored in a dark place, the cassette support member 10, which serves as support means, assumes the form of a box-like housing and is configured such that a large opening is formed at. the front thereof and such that the large opening can be covered with a screen 12. When the medicine containers 1 are not used, the screen 12 is lowered so as to darken the interior of the cassette support member 10. When the medicine containers 1 are used, for example, during operation, the screen 12 is taken up into a take-up 13 so as to open the opening of the cassette support member 10. In this state, a user can load the medicine container 1 into or unload the medicine container 1 from each of the cassettes 20.

Next, a fifth embodiment of the present invention will be described.

Figure 37:
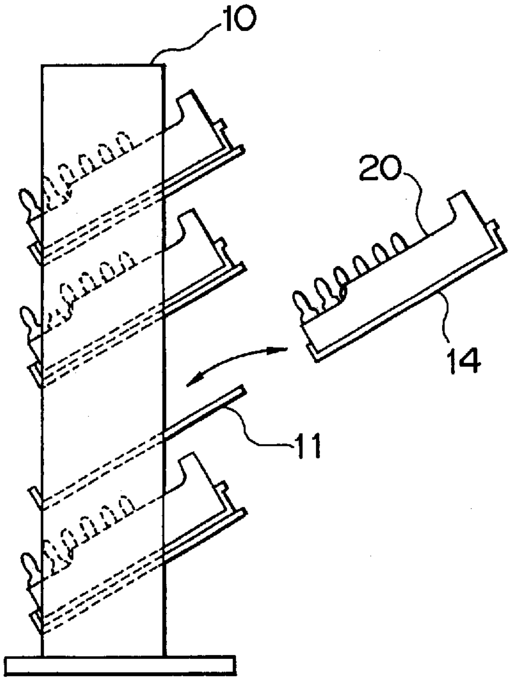
FIG. 37 is a right-hand side view of a cassette support member used in a fifth embodiment of the present invention.

As shown in FIG. 37, the cassette support member 10, which serves as support means, assumes the form of a frame and is configured such that a large opening is formed at the front and at the rear thereof. The cassettes 20 are supported by the cassette support member 10 in such a manner as to be exposed at the front and at the rear of the cassette support member 10. Since the cassette shelves 11 are inclined downward toward the front of the cassette support member 10, a user can, for example, load the cassettes 20 onto the cassette shelves 11 or replace the cassettes 20 on the cassette shelves 11 with other cassettes 20, on a cassette holder 14 basis from behind the medicine storage apparatus in a simple manner.

Next, a sixth embodiment of the present invention will be described.

Figure 38:
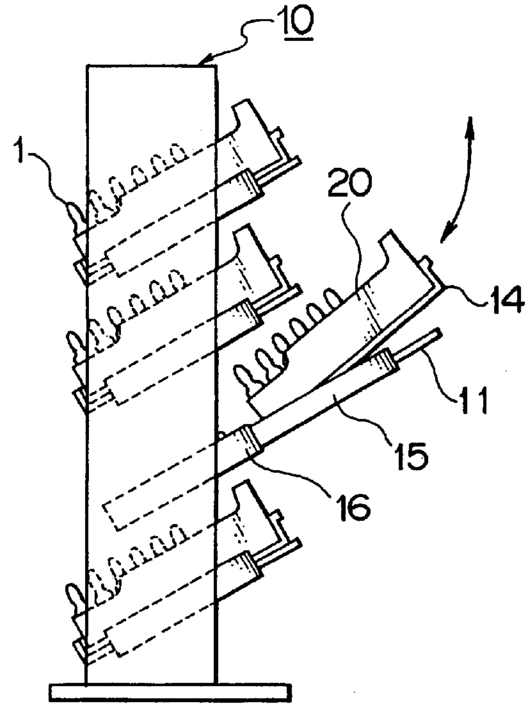
FIG. 38 is a right-hand side view of a cassette support member used in a sixth embodiment of the present invention.

As shown in FIG. 38, the cassette support member 10, which serves as support means, assumes the form of a frame and is configured such that a large opening is formed at the front and at the rear thereof. The cassettes 20 are supported by the cassette support member 10 in such a manner as to be exposed at the front and at the rear of the cassette support member 10. Drawer mechanisms are disposed so as to support the corresponding cassette shelves 11 in a drawable manner. The drawer mechanism includes a support rail 16 attached to a side panel of the cassette support member 10 and a drawer rail 15 which is slidable on the support rail 16 in the longitudinal direction of the support rail 16 and which can be drawn out from the support rail 16 rearward in an obliquely upward direction. Being drawn out, the drawer rail 15 is locked automatically. The locked drawer rail 15 is unlocked manually.

Accordingly, for example, the cassette 20 is removed in the following manner for replenishment with the medicine containers 1. The cassette holder 14 is drawn out rearward until the drawer rail 15 is locked. The cassette holder 14 is lifted so as to be removed from the drawer rail 15 and from the cassette shelf 11.

Also, a user can, for example, load the cassettes 20 onto the cassette shelves 11 or replace the cassettes 20 on the cassette shelves 11 with other cassettes 20, on a cassette holder 14 basis from behind the medicine storage apparatus in a simple manner.

Next, a seventh embodiment of the present invention will be described.

Figure 39:
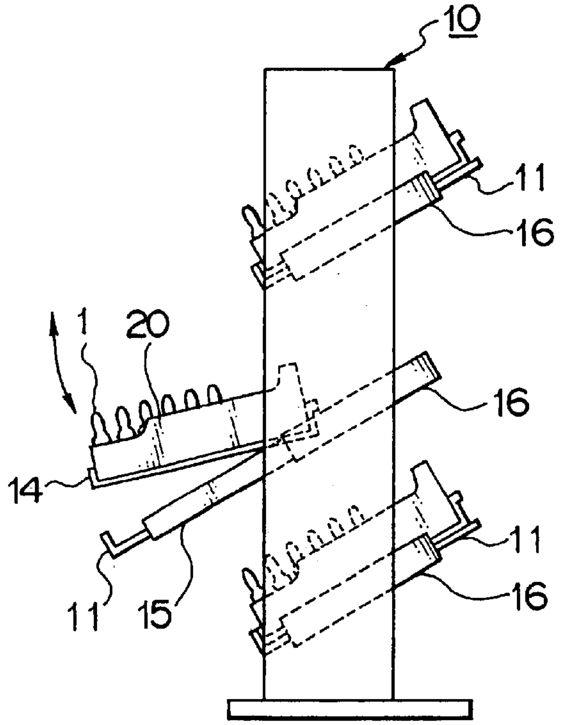
FIG. 39 is a right-hand side view of a cassette support member used in a seventh embodiment of the present invention.

As shown in FIG. 39, the drawer rail 15 is drawn out forward in an obliquely downward direction. Being retracted, the drawer rail 15 is locked automatically. The locked drawer rail 15 is unlocked manually.

Accordingly, for example, the cassette 20 is removed in the following manner for replenishment with the medicine containers 1. The drawer rail 15 of the cassette shelf 11 corresponding to the cassette 20 is unlocked. The drawer rail 15 is gradually drawn out forward until the drawer rail 15 stops. The cassette holder 14 is lifted so as to be removed from the drawer rail 15 and from the cassette shelf 11.

In this case, a user can, for example, load the cassettes 20 onto the cassette shelves 11 or replace the cassettes 20 on the cassette shelves 11 with other cassettes 20, on a cassette holder 14 basis at the front side of the medicine storage apparatus in a simple manner.

Next, an eighth embodiment of the present invention will be described.

Figure 40:
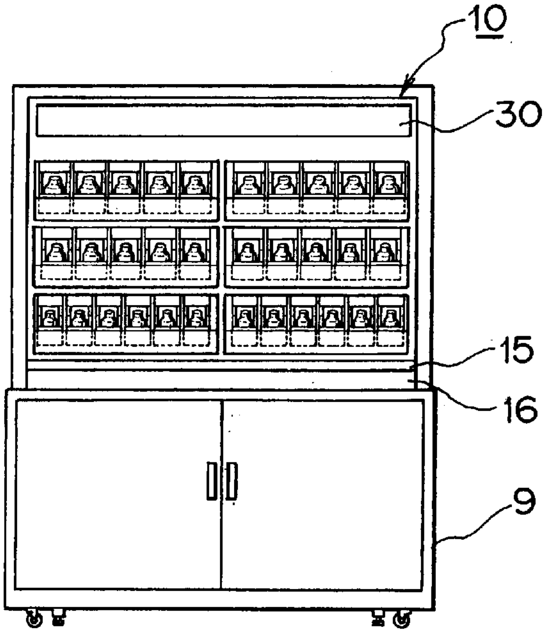
FIG. 40 is a front view of a medicine storage apparatus according to an eighth embodiment of the present invention.
Figure 41:
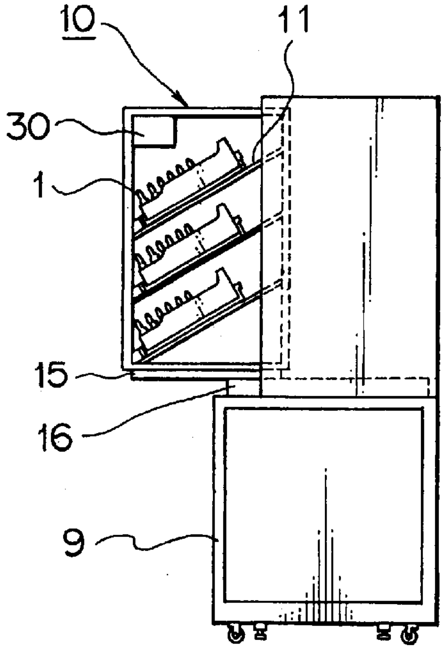
FIG. 41 is a side view of the medicine storage apparatus of the eighth embodiment, showing a cassette support member in a drawn-out state.
Figure 42:
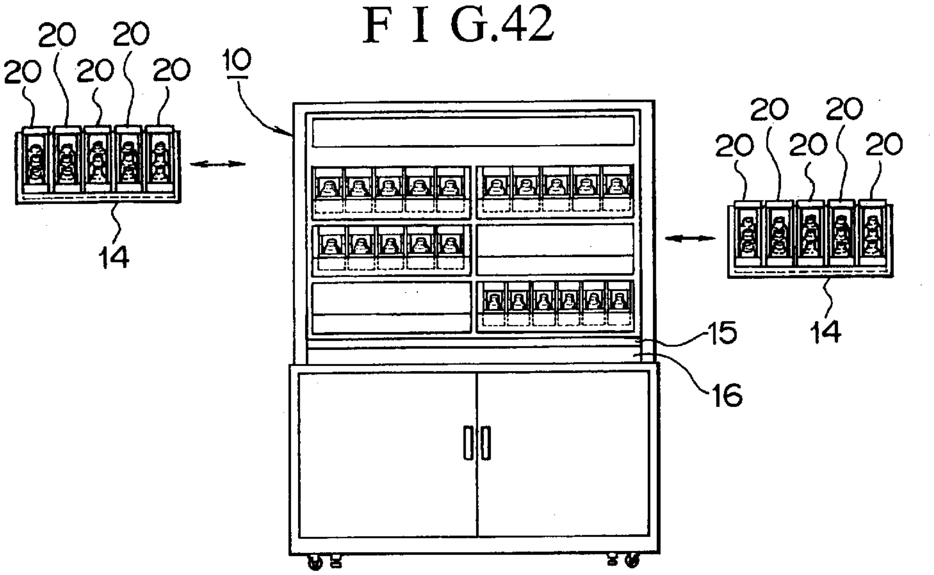
FIG. 42 is a view showing loading/unloading of cassettes in the eighth embodiment.

As shown in FIGS. 40 to 42, the medicine storage apparatus includes a drawer mechanism of large size composed of the drawer rail 15 and the support rail 16. The drawer mechanism enables a user to draw out the cassette support member 10, which serves as support means. Specifically, the cassette support member 10 is supported in a manner movable substantially horizontally in the front-rear direction. As shown in FIG. 41, when the cassette support member 10 is drawn out forward, the cassette support member 10 opens sideward in opposite directions. Therefore, each of the cassette holders 14 can be loaded and unloaded while being slid on the corresponding cassette shelf 11, through the left-hand or right-hand side surface of the cassette support member 10.

Since the cassette shelves 11 are inclined forward in a downward direction, a space is formed between the top cassette shelf 11 and an upper front-end portion of the cassette support member 10. The operation unit 30 is disposed within the space. The height of the base member 9 corresponds substantially to the waist position of a user so that the user in a standing position can readily draw out the medicine container 1 from each of the cassettes 20.

Since the cassette holders 14 can be unloaded from and be loaded into the medicine storage apparatus from the opposite sides of the apparatus, work for replacement of the cassettes 20 can be simplified.

Next, a ninth embodiment of the present invention will be described. Structural features common to the eighth embodiment are denoted by common reference numerals, and repeated description thereof is omitted.

Figure 43:
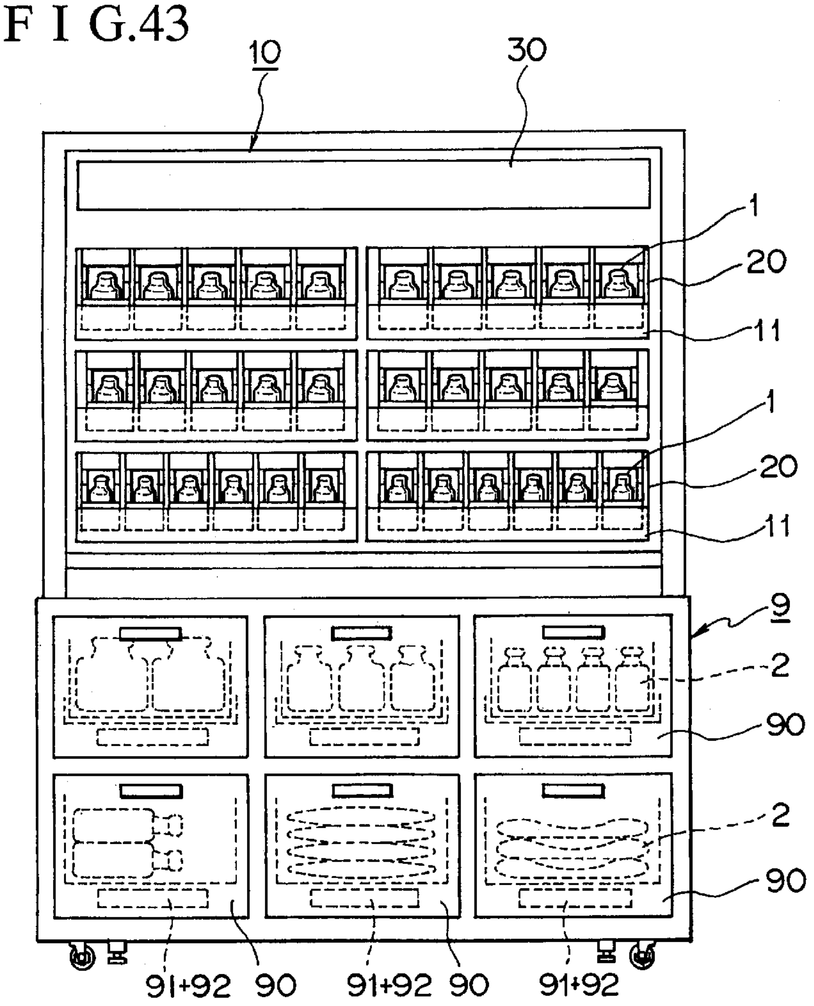
FIG. 43 is a front view of a medicine storage apparatus according to a ninth embodiment of the present invention.

As shown in FIG. 43, a single or a plurality of medicine storage box holders 90 are disposed in the base member 9. The medicine storage box holder 90 is supported in a drawable manner by a drawer member 93, which includes a drawer rail and serves as a drawer mechanism. When the medicine storage box holder 90 is drawn out forward, a medicine storage box 3 is exposed. In the base member 9, the cassettes 80 (FIG. 22) may be disposed adjacent to the medicine storage box holder 90.

Figure 44:
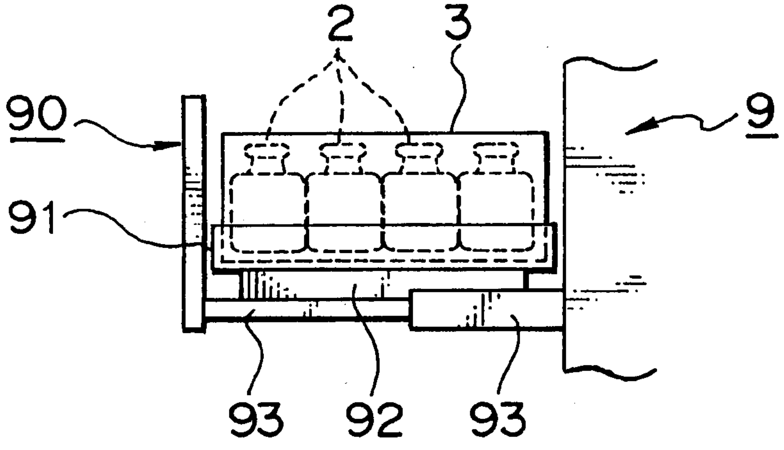
FIG. 44 is a view showing a first medicine storage box holder in a drawn-out state in the ninth embodiment.

In a plant, for example, a predetermined number (5 or 10, for example) of medicine containers 2, which serve as large items of medicine, are placed in the medicine storage box 3 shown in FIG. 44. The thus-prepared medicine storage box 3 is delivered to, for example, a pharmacy. The medicine storage box 3 is designed for easy removal of a top cover. The medicine storage box 3 which is opened through removal of the top cover is removably disposed in the medicine storage box holder 90. Specifically, the medicine storage box 3 is placed on a medicine storage box rest 91, which is disposed within the medicine storage box holder 90 and which assumes the form of a shallow pan and is broader than the bottom panel of the medicine storage box 3.

Figure 45:
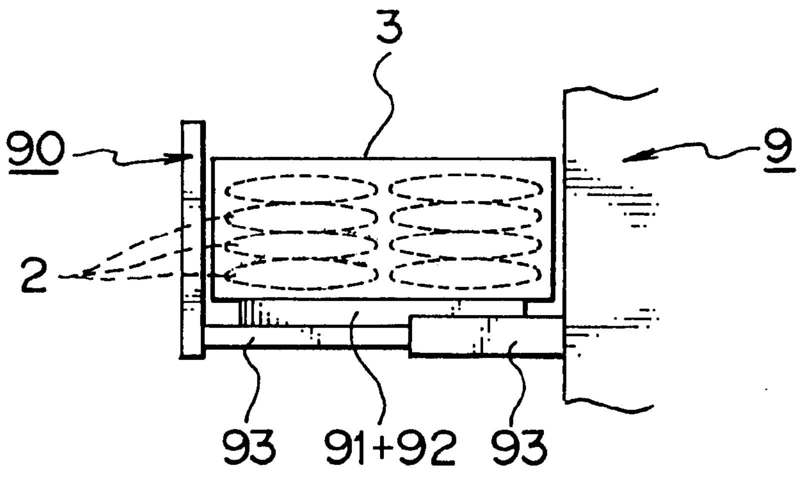
FIG. 45 is a view showing a second medicine storage box holder in a drawn-out state in the ninth embodiment.

The medicine storage box 3 shown in FIG. 45 is fixedly disposed in each of the medicine storage box holders 90. In order to allow transfer of the medicine containers 2, the medicine storage box 3 assumes the form of a deep, strong box which is open upward. In this case, the medicine storage box rest 91 for supporting the medicine storage box 3 is narrower than the bottom panel of the medicine storage box 3 and is formed integral with a weighing member 92, which will be described later.

As shown in FIGS. 44 and 45 the weighing member 92 is disposed below the medicine storage box rest 91 or the medicine storage box 3 and adapted to weigh the medicine containers 2 stored in the medicine storage box 3. Examples of the medicine container 2 include a 500 ml transfusion bottle and a 1000 ml transfusion bag. Several to several tens of such medicine containers 2 are stored in the medicine storage box 3. Accordingly, the weighing member 92 assumes the form of, for example, a load cell having an upper weighing limit of 3 kg, 10 kg, or 30 kg in weight (or mass). The result of weighing is transmitted to the main controller 56 as needed. Since the medicine containers 2 are each heavy, the number of the medicine containers 2 can be easily calculated even when the detection accuracy of the weighing member 92 is low.

The management data 59 includes offset values of the weighing members 92 corresponding to the medicine storage box holders 90 and unit weight values of the medicine containers 2. In the medicine storage apparatus, delivery of the medicine container 1 involves a single action, whereas delivery of the medicine container 2 involves two actions; specifically, an action of drawing out the medicine storage box holder 90 and an action of pushing back the holder 90. When the medicine container 2 is taken out from a predetermined medicine storage box holder 90, the weight of the corresponding medicine storage box 3 decreases. As a result, an output value of the corresponding weighing member 92 changes. On the basis of the change of an output value, the main controller 56 can calculate a change in the number of the medicine containers 2 as programmed.

When the medicine storage box 3 is to be replenished with the medicine container 2 or to be replaced with another medicine storage box 3, the medicine storage box rest 91 can be moved vertically by means of, for example, a lever. Use of, for example, a lever causes the medicine storage box 3 to be lifted from the load reception surface of the weighing member 92, thereby reducing load applied to the weighing member 92 and thus preventing a potential damage to the weighing member 92 or great variations in the output value.

Thus, not only the number of the medicine containers 1 but also the number of the medicine containers 2 can be calculated automatically and quickly. Since the medicine container 2 differs in handling from the medicine container 1 and has a greater unit weight, no problem arises even when a weighing process which is simple and inexpensive is employed for counting the number of the medicine containers 2. Thus, the medicine storage apparatus provides precise storage and management and enables a reduction in cost thereof.

Next a tenth embodiment of the present invention will be described. Structural features common to the ninth embodiment are denoted by common reference numerals, and repeated description thereof is omitted.

Figure 46:
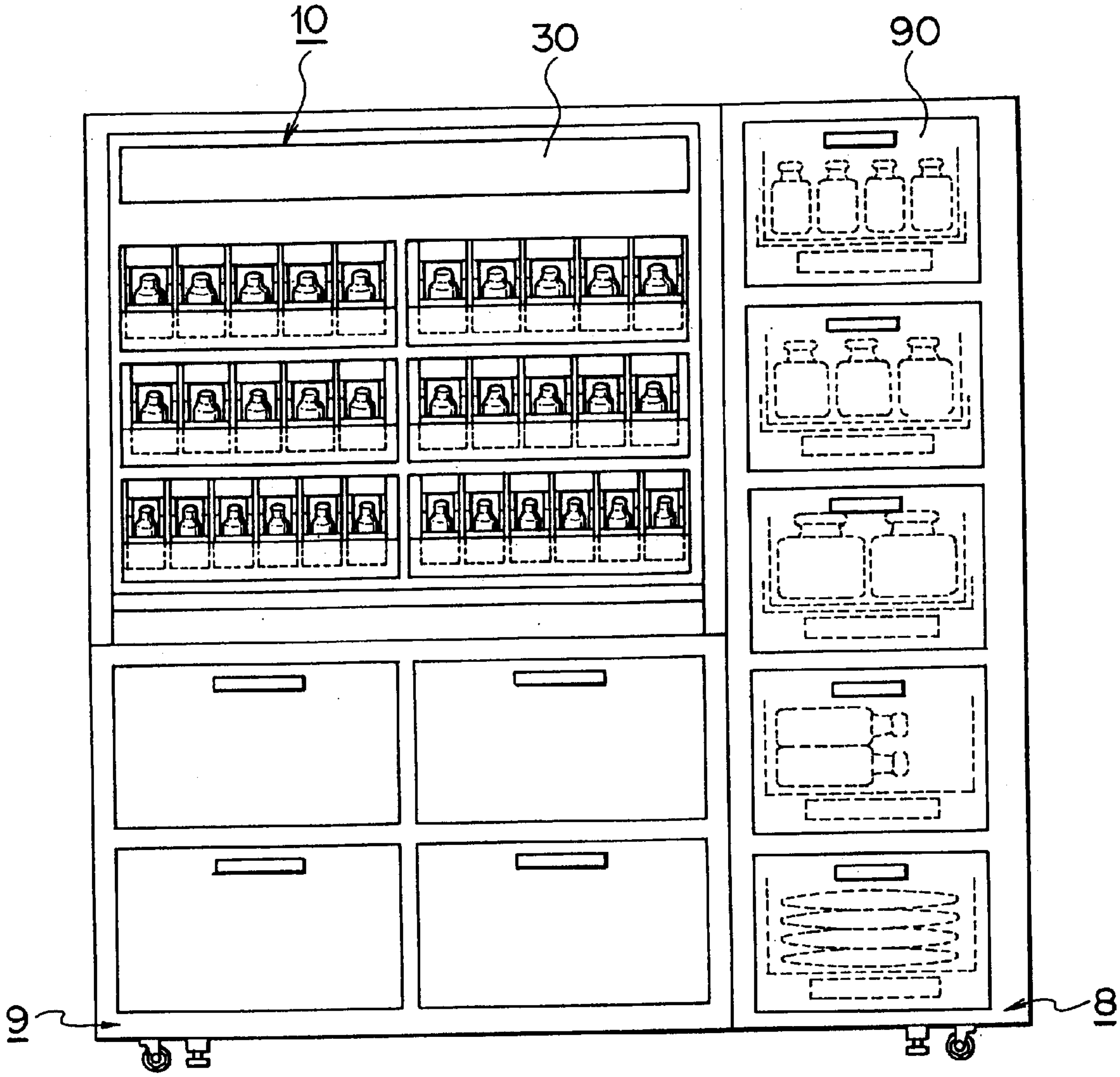
FIG. 46 is a front view of a medicine storage apparatus according to a tenth embodiment of the present invention.

As shown in FIG. 46, a side member 8 is disposed adjacent to the base member 9 and the cassette support member 10, which serves as support means. The medicine storage box holders 90 are disposed in the side member 8. Ordinary cabinets are formed in the base member 9 in order to store, for example, equipment and medicines which are used less frequently than are the medicine containers 2. When such equipment and medicines of less frequent use are to be managed in quantity, the bar code reader 61 (FIG. 22), for example, is used.

The above embodiments are described while mentioning the medicine container 1 assuming the form of an ampoule. However, the present invention is not limited thereto. For example, the medicine container 1 may assume the form of an undeformable medicine container, such as a vial, a box, or a bottle.

The above embodiments are described while mentioning force application means which assumes the form of the weight 22 and utilizes gravity. However, the present invention is not limited thereto. For examples the force application means may assume the form of a spring so as to utilize an elastic force, an air cylinder so as to utilize a hydrodynamic force, or an endless belt so as to utilize a friction force. In such a case, a cassette can also be supported horizontally. When the medicine container 1 involves no fear of falling and can move reliably merely by means of its own weight, there is no need to employ the force application means. The medicine containers 1 are biased toward the inlet-outlet opening 21 by the effect of their own weight.

The above embodiments are described while mentioning the cassette support member 10 assuming the form of a stationary rectangular structure. However, the present invention is not limited thereto. For example, the cassette support member 10 may assume the form of a rotary cylindrical structure.

The above embodiments are described while mentioning the cassette support member 10 equipped with the cassette shelves 11. However, the present invention is not limited thereto. For example, the cassette support member 10 may employ support members, such as angle material, in place of the cassette shelves 11, for supporting opposite end portions of each of the cassette holders 14. The cassette holder 14 also functions as a cassette shelf. In this case, the sensors 51 and the sensor substrates 53 can be disposed on the support members at those positions which do not interfere with the cassette holders 14. Alternatively, the sensors 51 and the sensor substrates 53 may be disposed on the cassette holders 14. When the cassette holders 14 are loaded into the cassette support member 10, the cassette holders 14 can be connected to the corresponding connectors either manually or automatically. Furthermore, signals required for count processing may be transmitted by radio.

The present invention is not limited to the above-described embodiments Numerous modifications and variations of the present invention are possible in light of the spirit of the present invention, and they are not excluded from the scope of the present invention.

What is claimed is:

1. A medicine storage apparatus comprising:

(a) a plurality of cassette, each cassette having an inlet-outlet opening for removal and insertion of medicine containers therethrough and adapted for storage of the medicine containers arranged in an array biased toward the inlet-outlet opening;

(b) support means for removably supporting said cassette with the inlet-outlet opening of each cassette exposed;

(c) at least one subject-under-detection;

(d) a plurality of sensors, mounted in said support means, for detecting said object-under-detection; and (e) a controller including arithmetic means for recieving the results of detection from all of the sensors and calculating the number of medicine containers stored in a cassette on the basis of the results of detection from all of the sensors.

2. A medicine storage apparatus according to claim 1, wherein said:

plurality of sensors are arranged in an array; for detecting a position of a medicine container in one of the cassettes furthest from the inlet-outlet opening of the one cassette.

3. A medicine storage apparatus according to claim 1, wherein said plurality of sensors are arrayed in positions corresponding to each medicine container in one of the cassettes, wherein the number of sensors is greater than the maximum number of medicine containers which can be held by the one cassette; and wherein said controller receives signals from the sensors corresponding to the arrangement of the sensors and, based on the signals, determines position of a medicine container furthest from the inlet-outlet opening of the one cassette.

4. A medicine storage apparatus according to claim 1, further comprising;

(f) a cassette holder for supporting said plurality of cassettes arranged in an array; and wherein said support means removably supports said cassette holder.

5. A medicine storage cabinet according to claim 1 wherein the cassettes have openings therethrough at positions corresponding to locations of the sensors.

6. A medicine storage apparatus according to claim 1 further comprising:

(f) a weight serving as said at least one object-under-detection, said weight being slidably disposed within at least one cassette in contact with an uppermost medicine container to force the medicine containers in the at least one cassette to slide toward the inlet-outlet opening; and wherein said plurality of sensors are arranged in a linear array extending along the length of a row of medicine containers stored in one of said cassettes, said plurality of sensors detecting the presence or absence of said weight at positions corresponding to respective sensors and generating signals indicative of the detections.

7. A medicine storage apparatus according to claim 6 wherein said support means is a shelf inclined relative to horizontal and wherein sensors are mounted in said shelf.

8. A medicine storage cabinet according to claim 6 wherein said weight comprises a permanent magnet and wherein said sensors are magnetic sensors.

9. A medicine storage apparatus according to claim 1, further comprising:

(f) a medicine storage box for storing items of medicine greater in size than the medicine containers; and (g) a medicine storage box support for supporting said medicine storage box; and wherein said arithmetic means also calculates the number of items of medicine of greater size.

10. A medicine storage apparatus according to claim 9, wherein said medicine storage box is removably supported by said medicine storage box support.

11. A medicine storage apparatus according to claim 9, further comprising a drawer mechanism for supporting said medicine storage box in a drawable manner.

12. A medicine storage apparatus according to claim 1 wherein said sensor are arranged in a linear array extending along a length corresponding to that of one cassette and detect the presence or absence of said follower at positions corresponding to respective sensors, and wherein said object-under-detection is associated with a follower mounted in the one cassette for biasing the medicine containers toward the inlet-outlet opening of one cassette.

13. A medicine storage apparatus according to claim 12 wherein said follower is a slidable weight.

14. A medicine storage apparatus according to claim 12 comprising a plurality of said linear arrays of sensors, each linear array positioned to correspond to one of said plurality of cassettes having said follower.

15. A medicine storage apparatus according to claim 14 wherein each of said followers is a slidable weight.

* * * * *

UNITED STATES PATENT AND TRADEMARK OFFICE

CERTIFICATE OF CORRECTION

PATENT NO. : 6,684,126 B2 
DATED : January 27, 2004
INVENTOR(S) : Omura et al

It is certified that error appears in the above-identified patent and that said Letters Patent is hereby corrected as shown below:

Column 1,
Line 29, "buckets." should read -- bucket --.

Column 20,
Line 9, "at." should read -- at --.

Column 23,
Lines 57 and 63, "cassette" should read -- cassettes --.

Column 24,
Line 8, "array;" should read -- array --.
Line 67, "sensor" should read -- sensors --.

Signed and Sealed this

Thirteenth Day of July, 2004

JON W. DUDAS
*Acting Director of the United States Patent and Trademark Office*